United States Patent
Ouderkirk et al.

(10) Patent No.: US 11,067,848 B1
(45) Date of Patent: Jul. 20, 2021

(54) SWITCHABLE REFLECTIVE DEVICES INCLUDING FIRST AND SECOND OPTICALLY TRANSPARENT MATERIALS WITH DIFFERENT REFRACTIVE INDEXES AND METHODS AND SYSTEMS FOR FABRICATION THEREOF

(71) Applicant: Facebook Technologies, LLC, Menlo Park, CA (US)

(72) Inventors: Andrew John Ouderkirk, Redmond, WA (US); Katherine Marie Smyth, Seattle, WA (US); Ken Diest, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/197,400

(22) Filed: Nov. 21, 2018

Related U.S. Application Data

(60) Provisional application No. 62/688,986, filed on Jun. 22, 2018.

(51) Int. Cl.
*G02F 1/1335* (2006.01)
*G02F 1/1347* (2006.01)
*G02B 5/32* (2006.01)
*G02B 5/30* (2006.01)
*G02F 1/1334* (2006.01)

(52) U.S. Cl.
CPC ..... *G02F 1/133536* (2013.01); *G02B 5/3016* (2013.01); *G02B 5/32* (2013.01); *G02F 1/13342* (2013.01); *G02F 1/13471* (2013.01)

(58) Field of Classification Search
CPC combination set(s) only.
See application file for complete search history.

(56) References Cited

U.S. PATENT DOCUMENTS

| | | |
|---|---|---|
| 2002/0186928 A1 | 12/2002 | Curtis |
| 2007/0202273 A1* | 8/2007 | Hirai ................ G02B 5/3025 428/1.31 |
| 2010/0002190 A1* | 1/2010 | Clarke ................ G02C 7/101 351/159.44 |
| 2010/0314704 A1* | 12/2010 | Matsugai ......... H01L 27/14629 257/432 |

(Continued)

OTHER PUBLICATIONS

Mullin et al., "Pattern Transformation Triggered by Deformation", Physical Review Letters, vol. 99, No. 8, 2007, 4 pages.

(Continued)

*Primary Examiner* — Lauren Nguyen
(74) *Attorney, Agent, or Firm* — FisherBroyles, LLP

(57) ABSTRACT

An electroactive device may include (i) a first conductor, (ii) a first optically transparent material electrically coupled to the first conductor, the first optically transparent material including a plurality of nanovoids and having a first refractive index, (iii) a second optically transparent material electrically coupled to the first optically transparent material, the second optically transparent material having a second refractive index that is lower than the first refractive index, and (iv) a second conductor electrically coupled to the second optically transparent material. Various other methods, systems, apparatuses, and materials are also disclosed.

13 Claims, 8 Drawing Sheets

(56) References Cited

U.S. PATENT DOCUMENTS

2017/0362502 A1* 12/2017 Lee .................. H01L 33/502
2018/0093456 A1    4/2018 Van Overmeere et al.

OTHER PUBLICATIONS

Babaee et al., "3D Soft Metamaterials with Negative Poisson's ratio", Advanced Materials, vol. 25, No. 36, 2013, 18 pages.

Bertoldi et al., "Novel negative Poisson's ratio behavior induced by an elastic instability", Advanced Materials, vol. 22, No. 3, 2010, pp. 1-11.

Overvelde et al., "Relating pore shape to the non-linear response of periodic elastomeric structures", Journal of the Mechanics and Physics of Solids, vol. 64, 2014, 16 pages.

Shen et al., "Simple cubic three-dimensional auxetic metamalerials", Physic. Status Solidi (B), vol. 251, No. 8, 2014, pp. 1515-1522.

Correa et al., "Negative Stiffness Honeycombs for Recoverable Shock Isolation", Rapid Prototyping Journal, vol. 21, No. 2, 2015, pp. 702-713.

Coulais et al., "Discontinuous Buckling of Wide Beams and Melabeams", Physical Review Letters, vol. 115, 2015, 7 pages.

Bickel et al., "Design and Fabrication of Materials with Desired Deformation Behavior", ACM Transactions on Graphics (TOG), vol. 29, No. 4, Jul. 2010, 10 pages.

Rosset et al., "Small, fast, and tough: Shrinking down integrated elastomer transducers", Applied Physics Reviews, vol. 3, No. 3, 2016, 17 pages.

Plante et al., "Large-scale failure modes of dielectric elastomer actuators", International Journal of Solids and Structures, vol. 43, 2006, pp. 7727-7751.

"Optotune DEAPs", Electroactive polymers, URL: https://www.optotune.com/technology/electroactive-polymers, 2019, 3 pages.

Product-Novasentis, "EMP Haptic Actuators for Sensory Innovation", URL: https://www.novasentis.com/product, 2019, 4 pages.

Rosset et al., "Mechanical characterization of a dielectric elastomer microactuator with ion-implanted electrodes", Sensor and Actuators A 144, 2008, 25 pages.

Gerratt et al., "Dielectric breakdown of PDMS thin films", Journal of Micromechanics and Microengineering, vol. 23, Apr. 26, 2013, 8 pages.

Hunt et al., "A self-healing dielectric elastomer actuator", Applied Physics Letters, vol. 104, 2014, 4 pages.

Skov et al., "Optimization Techniques for Improving the Performance of Silicone-Based Dielectric Elastomers", Advanced Engineering Materials, vol. 20, 2018, pp. 1-21.

Mazurek et al., "Glycerol as high-permittivity liquid filler in dielectric silicone elastomers", Journal of Applied Polymer Science, vol. 133, No. 43, 2016, 28 pages.

Rao et al., "Synthesis of flexible silica aerogels using methyltrimethoxysilane (MTMS) precursor", Journal of Colloid and Interface Science, vol. 300, 2006, pp. 279-285.

Seo et al., "Reticulated Nanoporous Polymers by Controlled Polymerization-Induced Microphase Separation", Science, vol. 336, Jun. 15, 2012, 5 pages.

Jennings, S.G., "The mean free path in air", Journal of Aerosol Science, vol. 19, No. 2, 1988, pp. 1-2.

Gupta et al., "Nanoemulsions: formation, properties and applications", Soft Matter, 2016, 16 pages.

Helgeson et al., "Mesoporous organohydrogels from thermogelling photocrosslinkable nanoemulsions", Nature Materials, vol. 11, Apr. 2012, pp. 344-352.

Guha et al., "Creating nanoscale emulsions using condensation", Nature Communications, 8:1371, 2017, pp. 1-7.

Meier et al., "Microemulsion elastomers", Colloid Polymer Science, vol. 274, 1996, pp. 218-226.

Richter et al., "Design considerations of form birefringent microstructures", Applied Optics, vol. 34, No. 14, May 10, 1995, pp. 2421-2429.

Mahadik et al., "Elastic and Superhydrophobic Monolithic Methyltrimethyoxysilane-based Silica Aerogels by Two-step Sol-Gel Process", Journal Microelectron, vol. 23, No. 1, 2016, pp. 35-39.

International Search report and Written Opinion received for PCT Application Serial No. PCT/IB2019/056844 dated Mar. 13, 2020, 15 pages.

Kim et al., "Enhanced oxygen detection using porous polymeric gratings with integrated recognition elements", ScienceDirect, Sensors and Actuators B, vol. 130, No. 2, Nov. 17, 2007, pp. 758-764.

Kim et al., "Tunable Porous Photonic Bandgap Structures for Chemical and Biological Sensing", Proceedings of the SPIE, vol. 6322, Article: 632201, Aug. 30, 2006, pp. 1-10.

Crawford, Gregory P., "Electrically Switchable Bragg Gratings", Optics & Photonics News, Apr. 30, 2003, pp. 54-59.

Preinterview First Office Action received for U.S. Appl. No. 16/170,002 dated Jul. 31, 2020, 18 pages.

* cited by examiner

SWITCHABLE REFLECTIVE DEVICES INCLUDING FIRST AND SECOND OPTICALLY TRANSPARENT MATERIALS WITH DIFFERENT REFRACTIVE INDEXES AND METHODS AND SYSTEMS FOR FABRICATION THEREOF

CROSS REFERENCE TO RELATED APPLICATION

This application is a non-provisional utility application which claims the benefit of U.S. Provisional Application No. 62/688,986 filed Jun. 22, 2018, the disclosure of which is incorporated, in its entirety, by this reference.

BACKGROUND

Optical reflectors may operate by creating constructive or destructive interference. Conventional optical reflectors, however, may not be electronically controllable (e.g., switchable). Moreover, optical reflectors may be made using liquid crystals; such devices may have relatively low reflectivity per unit of thickness, may exhibit relatively slow switching speeds, and may only work for a given polarization of light. Another approach to modulating light by interference may involve using a cavity structure that includes a first partial mirror, an air gap, and a second partial mirror. While this structure may be able to achieve high-speed modulation, it may additionally reflect broad wavelength ranges and may be difficult to manufacture. Therefore, there is a need for an easily controllable and manufacturable optical reflector.

SUMMARY

As will be described in greater detail below, the instant disclosure describes electroactive devices and methods for manufacturing such electroactive devices which may be used as switchable reflective elements in optical assemblies (e.g., lens systems).

In various embodiments, a device may include (i) a first conductor, (ii) a first optically transparent material electrically coupled to the first conductor, the first optically transparent material including a plurality of nanovoids and having a first refractive index, (iii) a second optically transparent material electrically coupled to the first optically transparent material, the second optically transparent material having a second refractive index that may be greater than the first refractive index, and (iv) a second conductor electrically coupled to the second optically transparent material.

In one embodiment, the device may be configured to operate in a first state corresponding to a first reflectance of the device for a wavelength range and a second state corresponding to a second reflectance of the device for the wavelength range, where the first reflectance may be greater than the second reflectance. In another embodiment, a first voltage may be applied between the first conductor and the second conductor when the device is operated in the first state. A second voltage may be applied between the first conductor and the second conductor when the device is operated in the second state. Further, the first voltage may be less than the second voltage.

In one embodiment, the first optically transparent material may have a first thickness when the device is operated in the first state and a second thickness when the device is operated the second state, the first thickness being greater than the second thickness. In another embodiment, the first optically transparent material may have the first refractive index when the device is operated in the first state and the first optically transparent material may have a third refractive index when the device is operated in the second state, the third refractive index being less than the first refractive index. In one embodiment, the first optically transparent material may have a first density, when the device is operated in the first state, that may be less than a second density of the first optically transparent material when the device is operated in the second state. In another embodiment, the first optically transparent material may include poly(methyl methacrylate) (PMMA) and the first refractive index may be between approximately 1.4 and approximately 1.6. In one embodiment, the second optically transparent material may include a crosslinked polymer and the second refractive index may be between approximately 1.0 and approximately 1.3. In another embodiment, the first conductor and/or the second conductor may be a transparent conductor.

In another embodiment, the device may further include a first integer number of additional optically transparent materials that each include a plurality of nanovoids and have a refractive index that may be substantially equal to the first refractive index, and a second integer number of additional optically transparent materials that each have a refractive index that may be lower than the first refractive index. In one embodiment, a reflectance of the device for a wavelength range may be based at least in part on the first integer number or the second integer number.

In various embodiments, a device may include (i) a first conductor, (ii) a first holographic material electrically coupled to the first conductor, the first holographic material including a plurality of nanovoids and having a first refractive index, and (iii) a second conductor electrically coupled to the first holographic material.

In another embodiment, the device may be configured to operate in a first state corresponding to a first reflectance of the device for a wavelength range, and may be configured to operate in a second state corresponding to a second reflectance of the device for the wavelength range, where the first reflectance may be greater than the second reflectance.

In one embodiment, a first voltage may be applied between the first conductor and the second conductor in the first state, and a second voltage may be applied between the first conductor and the second conductor in the second state, the first voltage being less than the second voltage. In another embodiment, the first holographic material may have a first thickness when the device is operated in the first state and a second thickness when the device is operated in the second state, the first thickness being greater than the second thickness. In one embodiment, the first conductor and/or the second conductor may be a transparent conductor.

In one embodiment, the first holographic material may have the first refractive index when the device is operated in the first state and the first holographic material may have a second refractive index when the device is operated in the second state, the second refractive index being less than the first refractive index. In another embodiment, the first holographic material may have a first density, when the device is operated in the first state, that may be less than a second density of the first holographic material when the device is operated in the second state.

In various embodiments, a method may include (i) condensing a first vapor on a substrate and applying radiation to the substrate to form a first layer, the first vapor including mixture of a first curable material and a solvent, (ii) condensing a second vapor on the first layer and applying radiation to the substrate to form a second layer, the second vapor including a second curable material, and (iii) removing the solvent from the first layer to form a nanovoided layer having a first refractive index that is less than a second refractive index of the second layer. In another embodiment, the substrate may include a first conductor and may have a first portion having a first surface energy and a second portion having a second surface energy. The method may further include depositing, after condensing the first vapor on the substrate, a first solvent concentration on the first portion and a second solvent concentration on the second portion. The method may also include (i) applying a first voltage to the first conductor and the second conductor in a first state, and (ii) applying a second voltage to the first conductor and the second conductor in a second state, the first voltage being less than the second voltage.

BRIEF DESCRIPTION OF THE DRAWINGS

The accompanying figures illustrate a number of exemplary embodiments and are a part of the specification. Together with the following description, these figures demonstrate and explain various principles of the instant disclosure.

Figure 1:
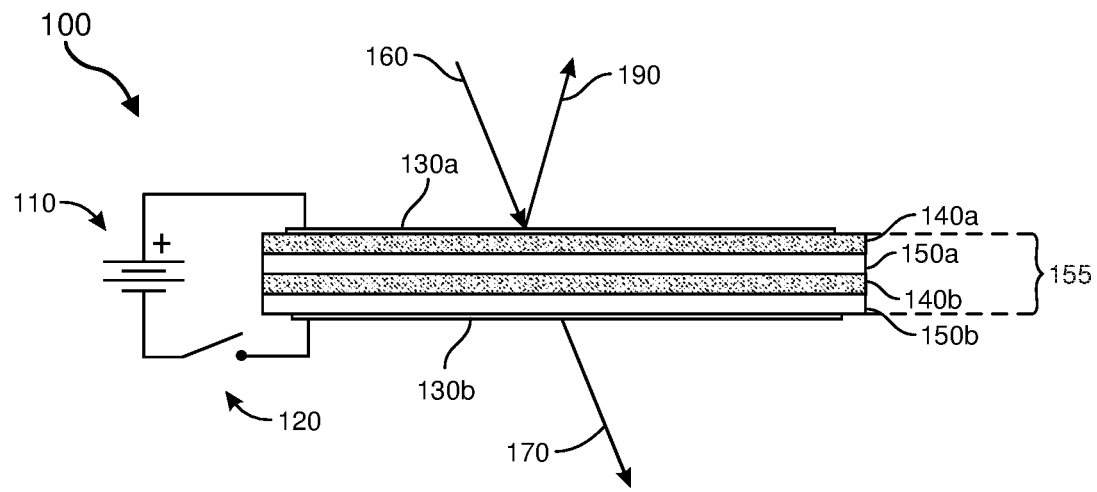
FIG. 1 shows a diagram of a switchable Bragg grating, in accordance with example embodiments of the disclosure.

Throughout the figures, identical reference characters and descriptions indicate similar, but not necessarily identical, elements. While the exemplary embodiments described herein are susceptible to various modifications and alternative forms, specific embodiments have been shown by way of example and will be described in detail herein. However, the exemplary embodiments described herein are not intended to be limited to the particular forms disclosed. Rather, the instant disclosure covers all modifications, equivalents, and alternatives falling within this disclosure.

DETAILED DESCRIPTION OF EXEMPLARY EMBODIMENTS

As will be explained in greater detail below, embodiments of the instant disclosure are generally directed to electroactive devices and materials, including nanovoided materials, and methods and systems for manufacturing and/or forming such electroactive devices and nanovoided materials.

Optical reflectors (such as Bragg reflectors, antireflective coatings, dichroic coatings, and holograms) may operate by means of constructive or destructive interference. As will be described in greater detail below, in some embodiments, nanovoided layers may be utilized in electroactive devices, such as switchable Bragg reflectors, gratings, and/or switchable holograms. The electroactive devices may be changed between two or more states by application of a voltage difference across the nanovoided layers, allowing for changes in various optical properties of the devices. In some embodiments, the disclosed devices (e.g., the switchable Bragg gratings and reflectors) may have higher contrast, lower polarization sensitivity, and higher switching times than comparable devices that use liquid crystals.

In some embodiments, the disclosed optical reflectors may be made using nanovoided materials. In some examples, a "nanovoided" material may refer to a material that contains pores (e.g., gas or liquid-filled pores). In at least one example, the pores may have an average diameter between approximately 2 and approximately 1000 nm (e.g., approximately 5 nm, approximately 10 nm, approximately 15 nm, approximately 20 nm, approximately 25 nm, approximately 30 nm, approximately 35 nm, approximately 40 nm, approximately 45 nm, approximately 50 nm, approximately 60 nm, approximately 70 nm, approximately 80 nm, approximately 90 nm, approximately 100 nm, approximately 150 nm, approximately 200 nm, approximately 250 nm, approximately 300 nm, approximately 350 nm, approximately 400 nm, approximately 450 nm, approximately 500 nm, approximately 600 nm, approximately 700 nm, approximately 800 nm, approximately 900 nm, approximately 1000 nm). In some embodiments, the diameter of such pores may be complex to measure in some structures, for example, in bi-continuous structures. In such cases, pore size may be derived and/or estimated from measurements of the porosity of the nanovoided material by alternative techniques, for example, by (i) measuring the compressibility of the nanovoided material and (ii) determining the average pore size by measuring the degree to which the nanovoided material scatters light. In an embodiment, the pore size may have a narrow or a wide distribution.

In some embodiments, nanovoided materials may be used in a switchable Bragg grating (also referred to herein as a Bragg reflector or a distributed Bragg reflector). A Bragg reflector may refer to a structure formed from multiple layers of one or more alternating materials with varying refractive index or having a periodic variation of a given characteristic (such as thickness of the layers), resulting in periodic variation in the effective refractive index in the structure. In another aspect, layer boundaries in the structure may cause partial reflections and partial transmissions of an incident optical wave.

In additional embodiments, nanovoided materials may be used in switchable volume holograms (e.g., holograms where the thickness of the recording medium, such as the nanovoided layer, may be greater than the spacing of the interference pattern in the recording medium). Moreover, a voltage may be applied between a first transparent conductor and a second transparent conductor. In some embodiments, incident light on a switchable volume hologram may have at least some wavelengths scattered by the nanovoided layer forming reflected scattered rays and transmitted scattered rays. The angle of the transmitted scattered rays and reflected scattered rays with respect to the surface of the nanovoided layer may be simple (e.g. a mirror-like reflection) to complex (e.g., including structured light patterns, images, and the like).

As further described below, in various embodiments, a method for forming an electroactive device may include (i) condensing a first vapor on a substrate and applying radiation to the substrate to form a first layer, the first vapor including a mixture of a first curable material, an initiator, and a solvent, (ii) condensing a second vapor on the first layer and applying radiation to the substrate to form a second layer having a first refractive index, the second vapor including a second curable material, and (iii) removing the solvent from the first layer to form a nanovoided layer having a second refractive index that may be less than the first refractive index. In at least one embodiment, the mixture may contain at least an average of approximately 10% by weight of solvent (e.g., approximately 20%, approximately 30%, approximately 50%, and the like). In another embodiment, the curable materials may be cured in any suitable manner, for example, by using a source of actinic energy. The curing process may also be initiated by, for example, remotely forming the free-radical initiator and bringing it in contact with the curable material. Further, for a multilayer electroactive device including multiple applications of the mixture of curable material and non-curable material, the multiple resulting layers may be cured sequentially (e.g., between the application of the layers), or at once (e.g., at the end of the deposition of the multiple layers). The methods and systems shown and described herein may be used to form electroactive devices having multiple layers (e.g., a few layers to tens, hundreds, or thousands of stacked layers).

The following will provide, with reference to FIGS. 1-13, detailed descriptions of systems, methods, and apparatuses for nanovoided materials, electroactive devices, and optical systems implementing electroactive devices and the fabrication thereof. The discussion associated with FIGS. 1 and 2 includes a description of a multi-layer electroactive device (e.g., a reflective device) that may be used with various embodiments. FIG. 3 shows an example of electroactive device reflectivity characteristics for different numbers of layers in the electroactive device. The discussion associated with FIGS. 4 and 5 includes a description of a holographic electroactive device (e.g., a holographic reflective device) that may be used with various embodiments. The discussion corresponding to FIGS. 6-11 includes descriptions of fabrication systems and methods that may be used to make the electroactive devices in accordance with various embodiments. Additionally, the discussion corresponding to FIG. 12 provides an example of a method for forming electroactive devices including nanovoided materials. The discussion corresponding to FIG. 13 describes an example head-worn display system including the disclosed electroactive devices having nanovoided materials. While some of the examples discussed herein may be directed to head-worn display systems, embodiments of the instant disclosure may be implemented in a variety of different types of devices and systems.

FIG. 1 shows a diagram of an electroactive device 100, such as a switchable Bragg grating, in a first state, in accordance with example embodiments of the disclosure. As shown in this figure, electroactive device 100 (e.g., a switchable Bragg grating) may include a voltage source 110, an open switch 120, a first transparent conductor 130a, and a second transparent conductor 130b. In some embodiments, the voltage source 110 may refer to a two-terminal device which may maintain a fixed voltage in an electronic circuit. In some embodiments, the first transparent conductor 130a and the second transparent conductor 130b may sandwich layers of first optically transparent materials 140a and 140b and second optically transparent materials 150a and 150b.

In one embodiment, the first optically transparent materials 140a and 140b may each include a nanovoided material (e.g., a polymer such as an elastomer having nanovoids), and second optically transparent materials 150a and 150b may each include a material with a substantially lower concentration of nanovoids as compared with first optically transparent materials 140a and 140b. In some examples, second optically transparent materials 150a and 150b may have no nanovoids, or approximately no nanovoids, or may have a different concentration of nanovoids. Alternatively, the second optically transparent materials 150a and 150b may have a similar concentration of nanovoids, but the polymer forming the second optically transparent materials 150a and 150b may have a substantially different refractive index than the first optically transparent materials 140a and 140b. In another embodiment, a nanovoid stack 155 may include the first transparent conductor 130a, the second transparent conductor 130b, the first optically transparent materials 140a and 140b, and the second optically transparent materials 150a and 150b.

In some embodiments, a light ray 160 may be incident on the nanovoid stack 155; moreover, the light ray 160 may be partially transmitted, forming transmitted ray 170, and/or partially reflected, forming reflected ray 190. In some embodiments, while two pairs of optically transparent materials (e.g., first optically transparent materials 140a and 140b and second optically transparent materials 150a and 150b) are shown, there may be more optically transparent materials (e.g., third, fourth, fifth, etc. pairs of optically transparent materials that are, for example, layered with and/or overlapping first optically transparent materials 140a and 140b and second optically transparent materials 150a and 150b).

In some embodiments, the switchable electroactive device 100 may be deposited on a substrate (not shown). The substrate may include transparent materials such as sapphire or glass. In one embodiment, the substrate may include silicon, silicon oxide, silicon dioxide, aluminum oxide, an alloy of silicon and germanium, and/or indium phosphide (InP), and the like. In some embodiments, the substrate may include a semiconductor material, such as, for example, monocrystalline silicon, germanium, silicon germanium, SiGe, and/or a III-V based material (e.g., gallium arsenide and/or another III-V semiconductor), or any combination thereof. In various embodiments, the substrate may include a polymer-based substrate, glass, or any other bendable substrate that may also include two-dimensional materials (e.g., graphene and molybdenum disulfide), organic materials (e.g., pentacene), transparent oxides (e.g., indium gallium zinc oxide, IGZO), polycrystalline III-V materials, polycrystalline germanium, polycrystalline silicon, amorphous III-V materials, amorphous germanium, amorphous silicon, or any combination thereof.

In various embodiments, the first transparent conductor 130a and/or the second transparent conductor 130b may be configured in any suitable manner. For example, in some embodiments, the first transparent conductor 130a and/or the second transparent conductor 130b may be formed from a thin film of electrically conductive and semi-transparent material, such as indium tin oxide (ITO). In some implementations, alternatives to ITO may be used, including other transparent conductive oxides (TCOs), including wider spectrum TCOs, conductive polymers, metal grids, carbon nanotubes (CNT), graphene, nanowire meshes, and thin-metal films. Additional TCOs may include doped binary compounds, such as aluminum-doped zinc-oxide (AZO) and indium-doped cadmium-oxide. Moreover, TCOs may include barium stannate and metal oxides, such as strontium vanadate and calcium vanadate. In some implementations, conductive polymers may be used. For example, a poly(3,4-ethylenedioxythiophene) poly(styrene sulfonate) (PEDOT:PSS) layer may be used. In another example, a poly (4,4-dioctyl cyclopentadithiophene) material doped with iodine and/or 2,3-dichloro-5,6-dicyano-1,4-benzoquinone (DDQ) may be used. The example polymers and similar materials may be spin-coated in some example embodiments.

Further, the first transparent conductor 130a and/or the second transparent conductor 130b may include any suitable material such as electrically conductive materials suitable for use in thin-film electrodes, such as, for example, aluminum, silver, indium, gallium, zinc, carbon black, and/or any other suitable materials formed by vacuum deposition, spray, adhesion, and/or any other suitable technique. In some embodiments, the first transparent conductor 130a and/or the second transparent conductor 130b may be self-healing, such that damage from local shorting of a circuit may be isolated. Suitable self-healing electrodes may include thin films of metals, such as aluminum. In some configurations, it may be necessary for the first transparent conductor 130a and/or the second transparent conductor 130b to stretch elastically. In such embodiments, the first transparent conductor 130a and/or the second transparent conductor 130b may include TCOs, graphene, carbon nanotubes, and the like.

In some embodiments, the first transparent conductor 130a and/or the second transparent conductor 130b may have a thickness of approximately 1 nm to approximately 500 nm (e.g., approximately 1 nm, approximately 5 nm, approximately 10 nm, approximately 15 nm, approximately 20 nm, approximately 25 nm, approximately 30 nm, approximately 35 nm, approximately 40 nm, approximately 45 nm, approximately 50 nm, approximately 60 nm, approximately 70 nm, approximately 80 nm, approximately 90 nm, approximately 100 nm, approximately 150 nm, approximately 200 nm, approximately 250 nm, approximately 300 nm, approximately 350 nm, approximately 400 nm, approximately 450 nm, approximately 500 nm), with an example thickness of from approximately 10 nm to approximately 100 nm. As noted, the first transparent conductor 130a and/or the second transparent conductor 130b may be designed to allow healing of electrical breakdown (e.g., the electric breakdown of nanovoided materials).

In some embodiments, the first transparent conductor 130a and/or the second transparent conductor 130b may be fabricated using any suitable process. For example, the first transparent conductor 130a and/or the second transparent conductor 130b may be fabricated using physical vapor deposition (PVD), chemical vapor deposition (CVD), sputtering, spray-coating, spin-coating, atomic layer deposition (ALD), and the like. In another embodiment, the first transparent conductor 130a and/or the second transparent conductor 130b may be manufactured using a thermal evaporator, a sputtering system, a spray coater, a spin-coater, an ALD unit, and the like.

In some embodiments, the optically transparent materials (e.g., the first optically transparent materials 140a and 140b and second optically transparent materials 150a and 150b) may include electroactive polymers and/or elastomer materials. As used herein, "electroactive polymers" may refer to polymers that exhibit a change in size or shape when stimulated by an electric field. In some examples, an "electroactive polymer" may refer to a deformable polymer that may be symmetric with regard to electrical charge (e.g., polydimethylsiloxane (PDMS) acrylates, and the like) or asymmetric (e.g., poled polyvinylidene fluoride (PVDF) or its copolymers such as poly(vinylidenefluoride-co-trifluoroethylene) (PVDF:TrFE).

Some electroactive polymers may find limited applications due to a low breakdown voltage of the polymers with respect to the operating voltage used by electroactive devices (e.g., reflectors) that include the polymers. Accordingly, electroactive devices with reduced operating voltages and higher energy densities may be useful for many applications. Additional examples of polymer materials forming electroactive polymer materials may include, without limitation, styrenes, polyesters, polycarbonates, epoxies, halogenated polymers, such as PVDF, copolymers of PVDF, such as PVDF-TrFE, silicone polymers, and/or any other suitable polymer materials. Such materials may have any suitable dielectric constant or relative permittivity, such as, for example, a dielectric constant ranging from approximately 2 to approximately 30.

In some embodiments, an "elastomer material" may refer to a polymer with viscoelasticity (i.e., both viscosity and elasticity) and relatively weak intermolecular forces, and generally low elastic modulus (a measure of the stiffness of a solid material) and high failure strain compared with other materials. In some embodiments, the optically transparent materials (e.g., the first optically transparent materials 140a and 140b and/or second optically transparent materials 150a and 150b) may include an elastomer material that has an effective Poisson ratio of less than a predetermined value (e.g., less than approximately 0.35, less than approximately 0.3, less than approximately 0.2, or less than approximately 0.1). In at least one example, the elastomer material may have an effective density that is less than a predetermined value (e.g., less than approximately 90%, less than approximately 80%, less than approximately 60%, or less than approximately 40%) of the elastomer when densified (e.g., when the elastomer is compressed, for example, by electrodes to make the elastomer denser). As noted, in some examples, the optically transparent materials (e.g., the first optically transparent materials 140a and 140b and/or second optically transparent materials 150a and 150b) may be nanovoided (e.g., having a plurality of nano-sized voids in the material). In some embodiments, the nanovoids may be at least approximately 10% (alternatively, at least approximately 30%, at least approximately 50%, or at least approximately 70%) of the volume of the optically transparent materials.

In some examples, the term "effective density" may refer to a parameter that may be obtained using a test method where a uniformly thick layer of an optically transparent material (e.g., elastomer) may be placed between two flat and rigid circular plates. In some embodiments, the diameter of the optically transparent material being compressed may be at least 100 times the thickness the optically transparent material. The diameter of the optically transparent material may be measured, then the plates may be pressed together to exert a pressure of at least approximately $1\times10^6$ Pa on the optically transparent material, and the diameter of the optically transparent material may be remeasured. The effective density may be determined from the following expression: $D_{ratio}=D_{uncompressed}/D_{compressed}$, where $D_{ratio}$ may represent the effective density ratio, $D_{uncompressed}$ may represent the density of the uncompressed optically transparent material, and $D_{compressed}$ may represent the density of the uncompressed optically transparent material.

As noted, the electroactive devices (e.g., reflectors) may include transparent conductors (e.g., the first transparent conductor 130a and/or the second transparent conductor 130b), which may serve as electrodes. Further, some of the optically transparent materials (e.g., the first optically transparent materials 140a and 140b and/or second optically transparent materials 150a and 150b) may include a polymer material having nanovoids (e.g., a nanovoided polymer) that may be disposed between the transparent conductors. In some embodiments, the nanovoided polymer material may include particles of a material with a high dielectric constant (e.g., barium titanate). The particles may have an average diameter of between approximately 10 and approximately 1000 nm (e.g., approximately 10 nm, approximately 15 nm, approximately 20 nm, approximately 25 nm, approximately 30 nm, approximately 35 nm, approximately 40 nm, approximately 45 nm, approximately 50 nm, approximately 60 nm, approximately 70 nm, approximately 80 nm, approximately 90 nm, approximately 100 nm, approximately 150 nm, approximately 200 nm, approximately 250 nm, approximately 300 nm, approximately 350 nm, approximately 400 nm, approximately 450 nm, approximately 500 nm, approximately 600 nm, approximately 700 nm, approximately 800 nm, approximately 900 nm, approximately 1000 nm), with example average diameters of between approximately 10 and approximately 200 nm or between approximately 20 and approximately 100 nm.

In some embodiments, some of the optically transparent materials (e.g., the first optically transparent materials 140a and 140b and/or second optically transparent materials 150a and 150b) may include nanovoided polymer materials that may include thermoplastic polymers. Suitable polymers may include, but are not limited to, polyolefins, such as, for example, polyethylene homopolymers and copolymers, polypropylene, polypropylene homopolymers and copolymers, functionalized polyolefins, polyesters, poly(esterether), polyamides, including nylons, poly(ether-amide), polyether sulfones, fluoropolymers, polyurethanes, and/or mixtures thereof. Polyethylene homopolymers include those of low, medium or high density and/or those formed by high-pressure or low-pressure polymerization. Polyethylene and polypropylene copolymers include, but are not limited to, copolymers with C4-C8 alpha-olefin monomers, including 1-octene, 1-butene, 1-hexene and/or 4-methyl pentene.

Other non-limiting examples of suitable olefinic polymeric compositions for use as the nanovoided polymer materials include olefinic block copolymers, olefinic random copolymers, polyurethanes, rubbers, vinyl arylenes, and conjugated diener, polyesters, polyamides, polyethers, polyisoprenes, polyneoprenes, copolymers of any of the above, and/or mixtures thereof.

Examples of suitable copolymers for use as the nanovoided polymer materials include, but are not limited to, copolymers such as poly(ethylene-butene), poly(ethylenehexene), poly(ethylene-octene), and poly(ethylene-propylene), poly(ethylene-vinylacetate), poly(ethylene-methylacrylate), poly(ethylene-acrylic acid), poly(ethylene-butylacrylate), poly(ethylene-propylenediene), poly(methyl methacrylate), and/or polyolefin terpolymers thereof.

In some aspects, the nanovoided polymer materials may include elastomeric polymers, including styrenic block copolymers, elastomeric olefinic block copolymers, and/or combinations thereof. Non-limiting examples of suitable styrenic block copolymers (SBC's) include styrene-butadiene-styrene (SBS), styrene-isoprene-styrene (SIS), styrene-ethylene-butylene-styrene (SEBS), styrene-ethylene-propylene (SEP), styrene-ethylene-propylene-styrene (SEPS), and/or styrene-ethylene-ethylene-propylene-styrene (SEEPS) block copolymer elastomers, polystyrene, and/or mixtures thereof. In one embodiment, the film may include styrene-butadiene-styrene, polystyrene, and/or mixtures thereof.

The nanovoided polymer materials may further include optional components, such as fillers, plasticizers, compatibilizers, draw-down polymers, processing aids, anti-blocking agents, viscosity-reducing polymers, and/or the like. Other additives may include pigments, dyes, antioxidants, antistatic agents, slip agents, foaming agents, heat or light stabilizers, ultraviolet (UV) stabilizers, and/or the like.

In some embodiments, the optically transparent materials (e.g., the first optically transparent materials 140a and 140b and second optically transparent materials 150a and 150b) may have a thickness of approximately 10 nm to approximately 10 μm (e.g., approximately 10 nm, approximately 20 nm, approximately 30 nm, approximately 40 nm, approximately 50 nm, approximately 60 nm, approximately 70 nm, approximately 80 nm, approximately 90 nm, approximately 100 nm, approximately 200 nm, approximately 300 nm, approximately 400 nm, approximately 500 nm, approximately 600 nm, approximately 700 nm, approximately 800 nm, approximately 900 nm, approximately 1 μm, approximately 2 μm, approximately 3 μm, approximately 4 μm, approximately 5 μm, approximately 6 μm, approximately 7 μm, approximately 8 μm, approximately 9 μm, approximately 10 μm), with an example thickness of from approximately 200 nm to approximately 500 nm.

As noted, in some embodiments, the optically transparent materials (e.g., the first optically transparent materials 140a and 140b and/or second optically transparent materials 150a and 150b) may include particles of a material having a high dielectric constant, the particles having an average diameter between approximately 10 nm and approximately 1000 nm. In some embodiments, the material having the high dielectric constant may include barium titanate ($BaTiO_3$), which is a member of the perovskite family, and/or other titanates. Additionally or alternatively, any other suitable component may be added to the electroactive polymer material. $BaTiO_3$ is a ferroelectric material with a relatively high dielectric constant (e.g., a value of between approximately 500 and approximately 7000) and polarization and may be used in various electroactive devices described herein. Besides large polarizability and permittivity, large strains may also be achievable with $BaTiO_3$. Pure $BaTiO_3$ may be an insulator whereas upon doping it may transform into a semiconductor in conjunction with the polymer material. In some embodiments, the particles of the materials having high dielectric constant may be included in the polymer to modify a mechanical (e.g., a Poisson's ratio) and/or electrical property (resistance, capacitance, etc.) of the electroactive polymer material.

Figure 2:
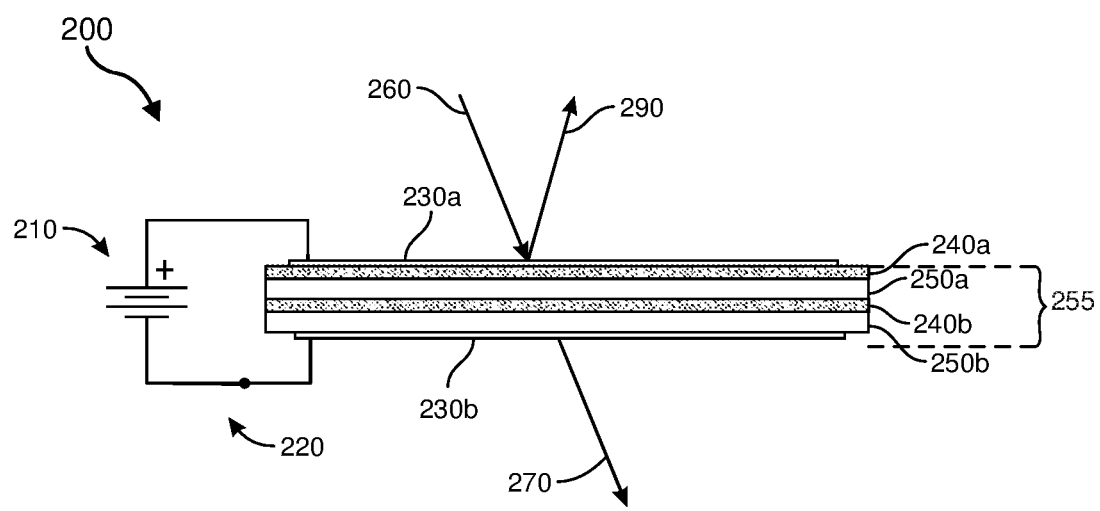
FIG. 2 shows a diagram of a switchable Bragg grating in a compressed state, in accordance with example embodiments of the disclosure.
Figure 3:
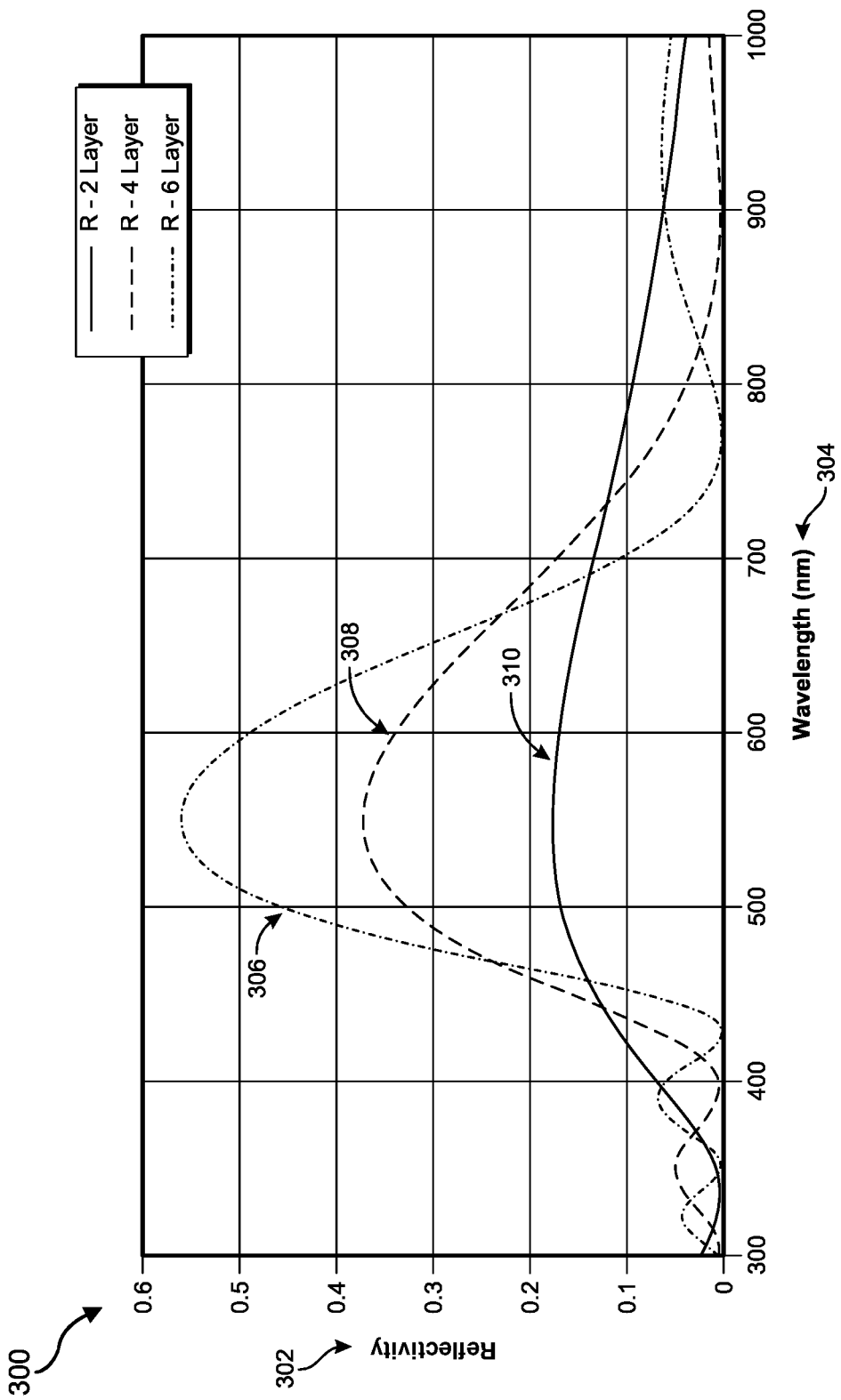
FIG. 3 shows a plot of reflectivity of switchable Bragg gratings, in accordance with example embodiments of the disclosure.

FIG. 2 shows a diagram of an electroactive device 200, such as a switchable Bragg grating, in a second state, in accordance with example embodiments of the disclosure. In particular, FIG. 2 shows a voltage difference (e.g., a positive voltage) applied by a voltage source 210 connected via wires and closed switch 220 to first transparent conductor 230a and second transparent conductor 230b of the electroactive device 200 (e.g., a switchable Bragg grating). While first and second states of the electroactive device are respectively illustrated in FIGS. 1 and 2, electroactive devices disclosed herein may be configured in one or more additional states by application of various voltage differentials via, for example, first and second transparent electrodes.

In at least one embodiment, electroactive device 200, which may be a Bragg grating, may represent a configuration of electroactive device 100 of FIG. 1 when a voltage difference is applied thereto. In some embodiments, the voltage difference between the first transparent conductor 230a and the second transparent conductor 230b may cause nanovoid stack 255 to mechanically compress, increasing the average refractive index of the nanovoided layers of the nanovoid stack 255. In particular, the compression of the nanovoid stack 255 may reduce the average refractive index difference between first compressed optically transparent materials 240a and 240b and second compressed optically transparent materials 250a and 250b as compared to the average refractive index difference between the first optically transparent materials 240a and 240b and the second optically transparent materials 250a and 250b. In some embodiments, the reduced index difference between the first compressed optically transparent materials 240a and 240b and the second compressed optically transparent materials 250a and 250b may substantially reduce the fraction of light 260 that is reflected (e.g., reflected light 290) by the nanovoid stack 255.

As noted, when the nanovoids are compressed, the index difference between the nanovoided layers and the non-nanovoided layers of the device may be reduced; however, the optical pathlength (e.g., the product of the geometric length of the path light follows through the layers of the nanovoid stack 255, and the index of refraction of the layers of the nanovoid stack 255 through which the light propagates) may be unchanged or substantially unchanged, and accordingly, the peak reflection (e.g., the wavelength of maximal reflectivity) for the electroactive device 200 may not change substantially either during the compression of the nanovoid stack 255. For example, if the electroactive device 200 is compressed by a factor of two, the refractive index may double while the thickness of the layers of the nanovoid stack 255 may be reduced by a half. Accordingly, the optical path of the device may remain the same. In contrast, in a device without compressible nanovoids, if index of refraction changes while the thickness of the layers remains the same, the optical pathlength may change and, accordingly, the peak wavelength of the device may shift.

In another embodiment, the first optically transparent materials 240a and 240b (e.g., the materials having nanovoids) may be in a state such that the nanovoids are compressed without the application of an electric field to the electroactive device 200. For example, the first optically transparent materials 240a and 240b may be in a given state including, but not limited to, an in-plane uniaxial tension, an in-plane biaxial tension, an applied compressive stress out of the plane of the films, combinations thereof, and/or the like. In one embodiment, the voltage difference between the transparent conductors 230a and 230b may cause the nanovoided stack 255 to expand from the state illustrated in FIG. 2 to a state similar to that of the nanovoided stack 155 of FIG. 1. In this case, the first optically transparent materials 240a and 240b (e.g., the nanovoided materials) may have relatively higher refractive indices in the non-expanded state during which no electric field is applied; accordingly, there may be relatively lower refractive index contrast between the first optically transparent materials 240a and 240b and the second optically transparent materials 250a and 250b under the conditions of no applied field electric field on the nanovoided stack 255. In this example, with the application of an electric field to the electroactive device, the refractive indices of the first optically transparent materials 240a and 240b may decrease such that the refractive index contrast between the first optically transparent materials 240a and 240b and the second optically transparent materials 250a and 250b increases to a state similar to that of the nanovoided stack 155 of FIG. 1. Accordingly, the fraction of light that is reflected by the stack 255 of the electroactive device may increase under the application of the voltage or applied field to the electroactive device 200.

In another embodiment, a multi-layer stack (i.e., a broadband multi-layer stack) may have a greater number of first optically transparent material layers having a plurality of nanovoids (e.g., first optically transparent materials 140a and 140b of FIG. 1) and/or a greater number of second optically transparent material layers having a substantially lower concentration of nanovoids (second optically transparent materials 150a and 150b of FIG. 1) than stack 155 shown in FIG. 1. Such a multi-layer stack may have an adjusted thickness (e.g., an increased thickness) in comparison to stack 155, with the thickness increasing in accordance with an increased number of layers. Additionally or alternatively, the thicknesses of the first and second optically transparent materials may be adjusted (e.g., decreased in comparison to first optically transparent materials 140a and 140b and/or second optically transparent materials 150a and 150b) as the number of layers is increased. In such an embodiment, the range of wavelengths that are reflected by the multi-layer stack may increase such that an electroactive device including the multi-layer stack (see, e.g., electroactive device 100 of FIG. 1) may be more broadband in comparison to the electroactive device 100. In this example, the density of nanovoids may or may not be the same as the density of nanovoids in other embodiments described herein as the thickness of the multi-layer stack and/or the thickness of the first optically transparent materials and/or the second optically transparent materials is changed so as to adjust the compliance of the first optically transparent materials. Accordingly, by applying one voltage across the multi-layer stack, the layers (e.g., each of the first optically transparent materials) can be compressed simultaneously to change the reflectivity of the multi-layer stack.

In some embodiments, a multi-layer stack, such as the broadband multi-layer stack described above having a greater number of first optically transparent material layers and second optically transparent material layers than illustrated in FIGS. 1 and 2, may include nanovoided first optically transparent materials that are in a state such that the nanovoids are compressed without the application of an electric field. Under an applied electric field, the multi-layer stack may expand in accordance with, for example, expansion of each of the first optically transparent materials. In this case, the nanovoided materials (e.g., the first optically transparent materials) may exhibit higher refractive index when no electric field is applied; accordingly, there may be a lower refractive index contrast between the first optically transparent materials and the second optically transparent materials in the case of no applied electric field. In this example, when an electric field is applied to the multi-layer stack, the first optically transparent materials may expand and the refractive indices of the nanovoided materials (e.g., the first optically transparent materials) may decrease such that the refractive index contrast between the first optically transparent materials and the second optically transparent materials is increased to a state similar to that of the nanovoided stack 155 of FIG. 1. Accordingly, the fraction of light that is reflected by such a multi-layer stack may increase under the application of the voltage or applied field.

In another embodiment, a multi-layer stack, such as the broadband multi-layer stacks described above having a greater number of first optically transparent material layers and second optically transparent material layers than illustrated in FIGS. 1 and 2, may have first and second optically transparent material layer thicknesses that are tuned to target reflection of one or more predetermined wavelength bands. Accordingly, an electroactive device including such a multi-layer stack may have a one or more specified transmission windows that remain relatively unaffected during the operation of the electroactive device.

In some embodiments, the application of a voltage to the electroactive nanovoid stack 255 may change the internal pressure of gasses and/or liquids in the nanovoided regions of the first compressed optically transparent materials 240a and 240b, which may include electroactive polymers, in comparison to the internal pressure of the gasses and/or liquids when transparent materials 240a and 240b are in an uncompressed state. In at least one example, gasses and/or liquids may diffuse either into or out of the electroactive polymers during dimensional changes associated with its deformation. Such changes in the electroactive polymers may affect, for example, the hysteresis of an electroactive device (e.g., electroactive device 200) incorporating the electroactive polymer during dimensional changes, and also may result in drift when the electroactive polymer's dimensions are rapidly changed. Accordingly, in an embodiment, the nanovoids may be filled with a gas to suppress electrical breakdown of the electroactive polymers (for example, during deformation). In another embodiment, the gas may include sulfur hexafluoride, fluorocarbon gases (such as 3M Novec 4710 insulating gas, available from 3M Company, Maplewood, Minn., USA), or any other suitable gas. In some embodiments, the electroactive device 200 may have a sealing layer (not shown) applied to the edges of the electroactive device 200 and/or to one or more of the transparent conductors (e.g., first transparent conductor 230a or second transparent conductor 230b). Suitable sealing layers may include thin film layers of an inorganic material, such as silica, applied with any suitable method, for example, atomic layer deposition (ALD), physical vapor deposition (PVD), chemical vapor deposition (CVD), or the like. The thin film layers may additionally or alternatively be made from one or more dyads of a polymer layer and an inorganic layer. In an embodiment, the sealing layer may additionally or alternatively include a barrier material such as polychlorotrifluoroethylene (PCTFE) or other polymer applied by solvent or with initiated-CVD (iCVD).

FIG. 3 shows a plot of simulated reflectivities of switchable Bragg gratings, in accordance with example embodiments of the disclosure. In particular, plot 300 shows simulations of the reflectivity 302 of a switchable Bragg grating versus wavelength 304 including a switchable Bragg grating having four-layers 308; that is, having two pairs of optically transparent materials (e.g., similar the electroactive devices 100 and 200 shown and described in connection with FIGS. 1 and 2). Plot 300 also shows the reflectivity of a switchable Bragg grating having two layers 306 (e.g., one pair of optically transparent materials) and a switchable Bragg grating having six layers 310 (e.g., three pairs of optically transparent materials). In some embodiments, the layers of the switchable Bragg grating shown in plot 300 may include layers that alternate between a relatively high refractive index material and a relatively low refractive index material. For example, the high refractive index materials may include poly(methyl methacrylate) (PMMA) having a refractive index of approximately 1.49. Further, the low index materials may include a nanovoided material, such as for example, a crosslinked polymer having an uncompressed refractive index of approximately 1.15. In some embodiments, the layers that are included in the switchable Bragg grating that are characterized by plot 300 may be deposited on a silica substrate. In some embodiments, backside reflections may not be considered in the simulations of plot 300. Further, the layer order of an electroactive device that is simulated and characterized by plot 300 may include a silica substrate, an optically transparent nanovoided layer, an optically transparent PMMA layer, a second optically transparent nanovoided layer, and a second optically transparent PMMA layer. In another embodiment, a PMMA layer (e.g., the second PMMA layer) may serve as the outermost layer of the layer stack. The nanovoided layers may be approximately 120 nm thick, and the PMMA layers may be approximately 92 nm thick.

In some embodiments, the reflectivity of the switchable Bragg grating may drop as the stacks are mechanically compressed (e.g., via application of a voltage). For example, the reflectivity may change from an initial level to zero and/or approximately zero when the compressed nanovoided layers (e.g., the PMMA layers) have the same index as the compressed layers with fewer or no nanovoids (e.g., the crosslinked polymer layers).

As noted, the substrate may include a silica substrate with no backside reflection (e.g., to ensure that the reflection diagram is due to the Bragg grating materials themselves and not the substrate). In some embodiments, for a two-layer device (e.g., corresponding to plot 306), including a high-index layer followed by a low-index layer, a reflectivity of about 18% may be obtained at the design wavelength of approximately 550 nanometers. For a four layer device (e.g., corresponding to plot 308), the reflectivity at 550 nanometers may be approximately 35%, and for a six-layer device (e.g., corresponding to plot 310), the reflectivity at 550 nanometers may be approximately 55%. In some embodiments, relatively thin, multilayer devices with a small number of layers may have a significant amount of reflectivity. This may be at least partially due to a low refractive index of the nanovoided material. Further, the reflectivity of the multilayer devices may be proportional to the square of the difference of the refractive indices of the layers. In some embodiments, devices may include a high-index layer of PMMA having a refractive index of approximately 1.49. In another embodiment, for a fixed low-index layer, devices including a high-index layer including materials with a refractive index of 1.6-1.65 (e.g., using an acrylate) may be used to obtain a larger reflection as compared with devices having a high-index layer of PMMA.

In some embodiments, plot 300 may represent the reflectivity of an electroactive device when the device is in an inactive state (e.g., with zero applied voltage). In another embodiment, as noted, when a voltage is applied to the device, the reflectivity of the device may have a value approaching zero or approximately zero, depending on the degree of nanovoid compression. For example, if the voids were compressed nearly 100%, then the reflectivity may go to approximately zero. In another example, if the voids are compressed to approximately 80%, the reflectivity may ordinarily not approach zero in comparison with the device with nanovoids that are compressed nearly 100%. In some embodiments, one way to obtain a reflectivity approaching zero for a device that has its nanovoids compressed less than approximately 100% (e.g., approximately 80%) may be to increase the refractive index of the host matrix of the nanovoided layer (e.g., polymer layer) such that the refractive index of the host matrix is higher than a predetermined amount (e.g., based on the materials, size of the nanovoids, thickness of the layers, refractive index, etc.) with respect to the refractive index of the non-nanovoided material.

In some embodiments, compressing the nanovoided layers may increase the index of refraction of the nanovoided layers. Accordingly, when the device is off (e.g., when the device does not have an applied voltage), the stack of nanovoided and non-nanovoided layers in the device may be reflective at least because the nanovoided layers are at a lower index of refraction as compared with the non-nanovoided layers. When the device is activated (e.g., the stack of nanovoided and non-nanovoided layers are compressed by applying a voltage to the device), the refractive index of the nanovoided layers may increase to match or nearly match the refractive index of the non-nanovoided layers.

In some embodiments, the bandwidth of the electroactive device (e.g., the Bragg reflector) may include a range of wavelengths from approximately 400 nanometers to approximately 700 nanometers. In another embodiment, the bandwidth of the device may be a function of the change in the refractive indices between the high-index layer(s) and the low-index layer(s) of the device. Accordingly, the larger the difference between the refractive indices between the nanovoided layers and non-nanovoided layers of the device, the broader the bandwidth of the device. In another embodiment, a narrow bandpass filter may be fabricated using (i) a multilayered device having a relatively high number of layers (e.g., an integer number of layers such as 6, 8, 10, 12, 14, etc.), and (ii) a device having a small refractive index difference between the refractive indices of the high-index layers and low-index layers.

In another embodiment, the bandwidth of the device may be tuned by fabricating a device having layer thicknesses that are varied in a gradient manner. For example, layers on the substrate and near the substrate may be thicker and then the remaining layers may be fabricated to be progressively thinner in comparison. Moreover, the index difference between the multi-layer stack including the thicker and thinner layers may be designed to be relatively small such that the bandwidth of the device is tuned to cover the visible spectrum.

In some example embodiments, an electroactive device as described herein may include a stack of from two optically transparent materials including electroactive nanovoided materials and corresponding transparent conductors to thousands of optically transparent materials (e.g., from 2 optically transparent materials to approximately 5, approximately 10, approximately 20, approximately 30, approximately 40, approximately 50, approximately 100, approximately 200, approximately 300, approximately 400, approximately 500, approximately 600, approximately 700, approximately 800, approximately 900, approximately 1000, approximately 2000, greater than approximately 2000 optically transparent materials).

Figure 4:
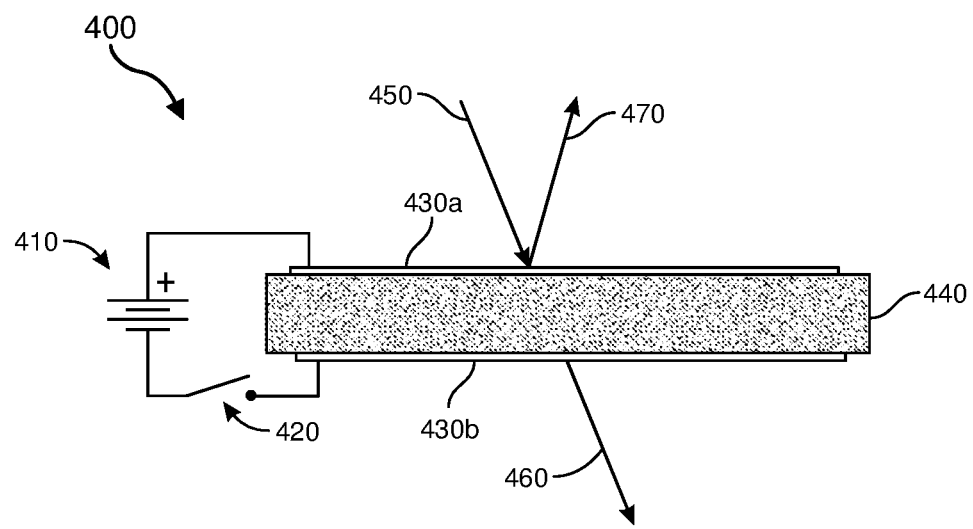
FIG. 4 shows a diagram of an interference structure, in accordance with example embodiments of the disclosure.

FIG. 4 shows a diagram of an interference structure, in a first state, in accordance with example embodiments of the disclosure. In particular, the illustrated interference structure 400 may include a holographic material (e.g., a volume holographic material) that may scatter incident light 450 by a three-dimensional distribution of nanovoids in a nanovoided layer 440. In some embodiments, a volume hologram may refer to a hologram where the thickness of the recording medium (e.g., the nanovoided layer) may be greater than the spacing of the interference pattern in the recording medium. A voltage source 410 may be connected to the interference structure 400 and may be controlled (e.g., turned on and turned off) by a switch 420, which is turned off in the interference structure 400 shown in FIG. 4. Moreover, the voltage may be applied between a first transparent conductor 430a and a second transparent conductor 430b. In some embodiments, incident light 450 may have at least some wavelengths scattered by the nanovoided layer 440 to form reflected scattered rays 470 and transmitted scattered rays 460. In at least one embodiment, the angle of the transmitted scattered rays 470 and reflected scattered rays 460 with respect to the surface of the nanovoided layer 440 may be complex (e.g., including structured light patterns, images, and the like).

As noted, in some embodiments, the interference structure 400 may include a switchable volume hologram. In another embodiment, the switchable volume hologram may include a nanovoided layer 440 having a complex three-dimensional structure. In some embodiments, the pattern of the nanovoided layer 440 representing the volume hologram may be determined before fabricating the three-dimensional structure of the nanovoided layer 440. For example, an interference pattern associated with the hologram may be determined, and then the nanovoided layer 440 may be designed to generate such a hologram, as will be further shown and described in connection with FIG. 7, below. This may be done, for example, by using radiation (e.g., polarized light, ultra-violet light, etc.) that may influence an initiator used in conjunction with a curable material (e.g., a monomer) and a solvent to make the nanovoided layer 440. Further, a solvent may be used that dissolves the monomer but does not dissolve the polymer that may be formed from the monomer upon irradiation.

In particular, a homogenous mixture of the solvent and the monomer may be exposed to a first type of radiation (e.g., ultraviolet (UV) light) to trigger the initiator to create free radicals. The monomer may then polymerize to form a polymer. In another embodiment, the solubility parameter of the polymer may be different than the solubility parameter of the monomer, and therefore, the polymer may precipitate out of the matrix of materials (e.g., monomer, solvent, and initiator material). This may thereby generate dense regions of relatively high polymer concentration where the polymer tends to retract itself and excludes the solvent to neighboring regions, thereby leading to the formation of the nanovoided polymers.

In some embodiments, the formation of the nanovoided layers via the process described above may not only include providing a solution which is exposed to UV light to cause phase separations and thereby create voids (e.g., 50 to 100 nanometer wide voids), but rather, may further include generating interference patterns using the radiation source (e.g., UV light) in the polymer. Accordingly, regions of high UV intensity and regions of low UV intensity may be provided in the polymer. Further, where a high intensity of UV light is provided, the initiator may be triggered, which may locally generate regions for the polymerization of the monomer, thereby excluding the solvent to the adjacent regions. When the polymer is cured and/or dried, nanovoids may be generated in those adjacent regions.

In some aspects, the monomers may be monofunctional or polyfunctional, or mixtures thereof. Polyfunctional monomers may be used as crosslinking agents to add rigidity or to form elastomers. Polyfunctional monomers may include difunctional materials such as bisphenol fluorene diacrylate, trifunctional materials such as trimethylolpropane triacrylate (TMPTA), or higher functional materials. Other types of monomers may be used, including isocyanates, and these may be mixed with monomers with different curing mechanisms.

In some embodiments, the solvent may have a vapor pressure that is similar to at least one of the monomers being evaporated. The solvent may dissolve both the monomer and the generated polymer (upon polymerization), or only the monomer. Alternatively, the solvent may have a low solubility for the monomer, or monomers if there is a mixture of monomers being applied. Furthermore, the solvent may be immiscible with the monomer(s) and may at least partially phase separate when condensed on the substrate. Furthermore, the solvent may be a mixture of different solvents.

In some embodiments, incident light may be diffracted by the interference structure 400 (e.g., the hologram) at a particular angle (e.g., a Bragg angle). In another embodiment, if the hologram is illuminated with a light source incident at the original reference beam angle but having a broad spectrum of wavelengths, reconstruction of the hologram may occur at the wavelength of the original light source. If the angle of illumination is changed, reconstruction may occur at a different wavelength, and the color of the reconstructed hologram may change.

Figure 5:
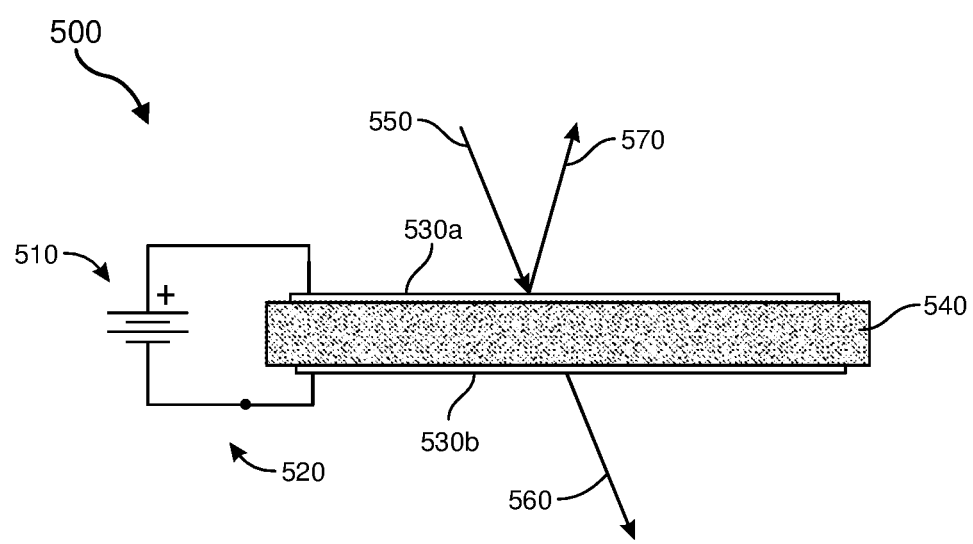
FIG. 5 shows a diagram of an interference structure in a compressed state, in accordance with example embodiments of the disclosure.

FIG. 5 shows a diagram of an interference structure (i.e., the interference structure 400 shown in FIG. 4) in a second state in which voids in the interference structure are compressed, in accordance with example embodiments of the disclosure. In particular, FIG. 5 shows interference structure 500 (see, e.g., interference structure 400 shown in FIG. 4), but in FIG. 5 switch 520 of voltage source 510 is turned on, thereby generating a voltage difference between first transparent conductor 530a and second transparent conductor 530b of interference structure 500. This voltage difference may serve to compress the nanovoids in the nanovoided layer 540, which may reduce the refractive index difference between the nanovoided and non-nanovoided regions of nanovoided layer 540. Accordingly, this compression of the nanovoids in nanovoided layer 540 may change the degree of interference created by the nanovoided layer 540. In some embodiments, as the compression of the nanovoided layer 540 increases, the degree of interference may cause the nanovoided layer 540 to reduce the amount of interference of the incident light (e.g., to zero or nearly zero interference). As additionally shown in FIG. 5, incident light 550 may have at least some wavelengths scattered by the nanovoided layer 540 to form reflected scattered rays 570 and transmitted scattered rays 560.

Figure 6:
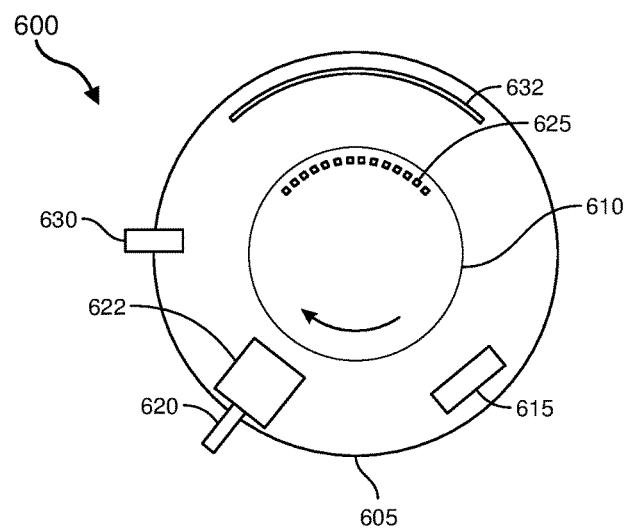
FIG. 6 shows a diagram including an apparatus that may be used for making a switchable Bragg grating, in accordance with example embodiments of the disclosure.

FIG. 6 shows a diagram including an apparatus that may be used for making an electroactive device, such as a switchable Bragg grating or portions of an interference structure (see, e.g., FIGS. 1, 2, 4, and 5), in accordance with example embodiments of the disclosure. In particular, the apparatus 600 may include a vacuum-based deposition apparatus including an enclosure (alternatively referred to as chamber) 605, a rotating drum 610, a heat source 625, an optional condenser 630, an optional source 615, a fluid source 620, and a curing source 632. As will be elaborated on further below, the electroactive device (e.g., a switchable Bragg grating or interference structure) may be fabricated by alternating (i) depositions of solvent and a nanovoid matrix material (e.g., acrylate), (ii) heating away the solvent (via evaporation) to create the nanovoided regions, and (iii) pumping in the nanovoid matrix material (e.g., acrylate) with no solvent. In various embodiments, a method may include (i) condensing a first vapor on a substrate and applying radiation to the substrate to form a first layer, the first vapor including mixture of a first curable material, an initiator, and a solvent, (ii) condensing a second vapor on the first layer and applying radiation to the substrate to form a second layer having a first refractive index, the second vapor including a second curable material, and (iii) removing the solvent from the first layer to form a nanovoided layer having a second refractive index that may be less than the first refractive index.

In some embodiments, the fluid source 620 may include a fluid that may have both a monomer (e.g., acrylic acid) and an optional crosslinking agent (e.g., trimethylolpropane triacrylate, TMPTA). In some examples, "monomer" may refer to a monomer that forms a given polymer (i.e., as part of an optically transparent material). In another embodiment, the fluid from the fluid source 620 may flow into and/or adjacent to heat source 622, creating vapor of the monomer and the optional crosslinker. This vapor may condense on a surface (e.g., a first transparent conductor 130a in FIG. 1) on the rotating drum 610 to form a first optically transparent material (e.g., first optically transparent material 140a in FIG. 1). Subsequent layers (e.g., second optically transparent materials 150a and 150b, and first optically transparent material 140b in FIG. 1) of the stack (e.g., nanovoid stack 155 in FIG. 1) may be similarly generated. Between depositions of layers or after deposition of two or more layers, the partially or fully fabricated electroactive device (e.g., a switchable Bragg reflector) may be cured by the curing source 632 and/or the heat source 625. Further, after the deposition of the nanovoid stack, the electroactive device may be coated with a material by an optional source 615. For example, the optional source 615 may apply a metal coating and/or a metal oxide coating, and/or combinations thereof to form another conductive layer (e.g., a second transparent conductor 130b in FIG. 1), as discussed above. In some embodiments, the apparatus 600 may include more than one optional source in addition to optional source 615.

In some embodiments, the apparatus 600 may use masks (e.g., shadow masks) to control the patterns of deposited materials to form an electroactive device. In some embodiments, the chamber 605 may be evacuated (e.g., using one or more mechanical vacuum pumps to a predetermined pressure, such as approximately $10^{-6}$ Torr or below). The chamber 605 may include a rigid material (e.g., steel, aluminum, brass, glass, acrylic, and/or the like). As noted, FIG. 6 shows an embodiment where the apparatus 600 may include a rotating drum 610. In some embodiments, the rotation of the rotating drum 610 may generate centrifugal energy to cause the deposited material to spread more uniformly over any underlying sequentially deposited materials (e.g., electrodes, optically transparent materials, and/or the like) that are mechanically coupled or bonded to the rotating drum 610. Alternatively, the rotating drum 610 may be configured to be fixed in position and the deposition and curing systems (e.g., monomers in the fluid source 620 and heat source 625, the optional source 615, and/or curing source 632) may be moving or both the rotating drum 610 and the deposition and curing systems may be moving simultaneously.

In some embodiments, the curing source 632 and/or heat source 625 may include an energized array of filaments that may generate actinic energy to heat the monomers and/or cross-linking agents. The monomers and/or cross-linking agents may react upon heating by the filaments to form optically transparent materials (e.g., a first optically transparent material 140*a*, etc.). In some examples, "actinic energy" may refer to energy capable of breaking covalent bonds in a material. Examples may include electrons, electron beams, x-rays, gamma rays, ultraviolet, and/or visible light at appropriately high energy levels, and ions.

In some embodiments, an exhaust port (not shown) of the chamber 605 may be opened to release at least a portion of the vapor in chamber 605 between one or more depositions of the materials (e.g., monomers, crosslinking agents, conductive materials, etc.). In another embodiment, chamber 605 may be purged (e.g., with a gas or the application of a vacuum, or both), to remove a portion of the vapor (e.g., monomers, crosslinking agents, metal particles, and/or resultant byproducts). Thereafter one or more of the previous steps may be repeated (e.g., for a second optically transparent material 150*a* in FIG. 1, etc.), as described above. In this way, individual layers of an electroactive device may be maintained at high purity levels.

In some embodiments, the deposition of the materials (e.g., monomers, crosslinking agents, conductive materials, etc.) of the device may be performed using a deposition process, such as chemical vapor deposition (CVD), to be described further below. CVD may refer to a vacuum deposition method used to produce high-quality, high-performance, solid materials. In CVD, a substrate may be exposed to one or more precursors, which may react and/or decompose on the substrate surface to produce the desired deposit (e.g., one or more transparent conductors, optically transparent materials, etc.). Frequently, volatile by-products may also be produced, which may be removed by gas flow through the chamber 605.

As noted above, a flowable material (e.g., a solvent) may be combined with the curable materials (e.g., monomers) to create a flowable mixture that may be used for producing optically transparent materials including electroactive polymers (e.g., elastomers) with nanovoids. In some embodiments, the flowable material may be combined (e.g., mixed) with the curable material (e.g., monomers). In some embodiments, the curable material itself may be combined with at least one non-curable component (e.g., particles of a material having a high dielectric constant and/or initiators) to form a mixture including the curable material and the at least one non-curable component. Additionally or alternatively, the flowable material (e.g., solvent) may be introduced into the fluid source 620 to deposit (e.g., via vaporization using the evaporator 625 and/or, in alternative embodiments, via printing) the curable material onto the conductor. In some embodiments, the flowable material (e.g., solvent) may be deposited as a separate layer either on top or below a curable material (e.g., a monomer), and the solvent and curable material may be allowed to diffuse into each other before being cured by the curing source 632 and/or the heat source 625 to generate an optically transparent material having nanovoids. In some embodiments, after the curable material is cured, the solvent may be allowed to evaporate before another optically transparent material and/or another conductor is formed. In some embodiments, the evaporation of the solvent may be accelerated by the application of heat to the substrate (not shown) with curing source 632 and/or the heat source 625, and/or by reducing the pressure of the solvent above the substrate using a condenser 630 (e.g., a device that condenses vapors into a liquid or solid by, e.g., cooling), or a combination thereof. Isolators (not shown) may be added to the apparatus 600 to prevent, for example, the solvent vapor from interfering with the curing source 632 or the optional source 615.

Figure 7:
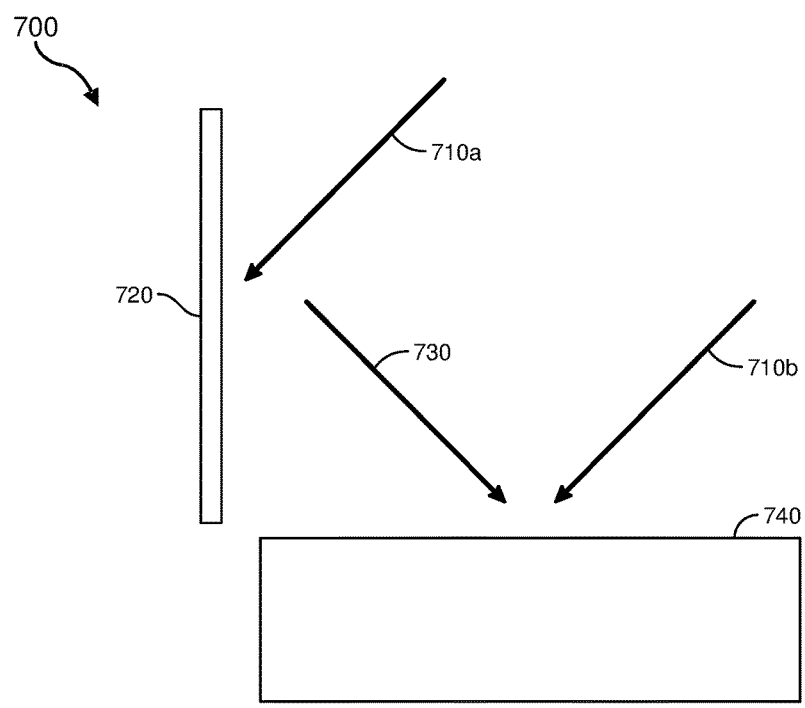
FIG. 7 shows aspects of optical interference as it may be used to fabricate the disclosed devices, in accordance with example embodiments of the disclosure.

FIG. 7 shows aspects of interference as it relates to formation of the exemplary devices, such as interference structures (see, e.g., FIGS. 4 and 5), as disclosed herein. In particular, first coherent light (e.g., first laser light) 710*a* may be incident on an interference-generating structure 720 (e.g., an object or a film with a predetermined pattern or arrangement of features to be generated in a hologram). In at least one embodiment, the incident light 710*a* may reflect off the interference generating structure 720 to generate reflected light 730. Further, the reflected light 730 may then interfere with a second coherent light 710*b* (e.g., second laser light) on a curable monomer 740. In one aspect, the first coherent light 710*a* (e.g., first laser light) and the second coherent light 710*b* (e.g., second laser light) may be separated using a beam splitter that divides an original common beam into two identical beams, each aimed in different directions to generate the interference. The interference of the reflected light 730 and the second coherent light 710*a* may create an interference pattern in the curable monomer 740, thereby generating a volume hologram (e.g., a recorded light pattern that may represent the diffraction grating).

In some embodiments, the exposure time of the curable monomer 740 to the first coherent light 710*a* (e.g., first laser light), reflected via the interference generating structure 720 as reflected light 730, and the second coherent light 710*b* (e.g., second laser light) may be controlled to generate the volume hologram from the curable monomer 740. In one embodiment, the first coherent light 710*a* and the second coherent light 710*b* may also be mutually coherent. For example, the first coherent light 710*a* and the second coherent light 710*b* may be formed from a single coherent laser beam and a beamsplitter that splits the single coherent laser beam to form the first coherent light 710*a* and the second coherent light 710*b*. In one aspect, the interference generating structure 720 may be an amplitude modulation hologram where the amplitude of light diffracted by the hologram is proportional to the intensity of the resulting light including the interference pattern arising from interference between the first coherent light 710*a* (e.g., first laser light) and the second coherent light 710*b* (e.g., second laser light). In another aspect, the interference generating structure 720 may be a phase hologram where the refractive index of the material is modulated in proportion to the intensity of the interference pattern. In another aspect, the interference generating structure 720 may include any suitable material that is able to fully resolve all or substantially all of the fringes arising from interference between the first coherent light 710*a* and the second coherent light 710*b*. Fringe spacings of the interference pattern can range from tens of micrometers to less than one micrometer (i.e. spatial frequencies ranging from a few hundred to several thousand cycles/mm) and the curable monomer 740 may have a response that may be relatively flat over this range.

Figure 8:
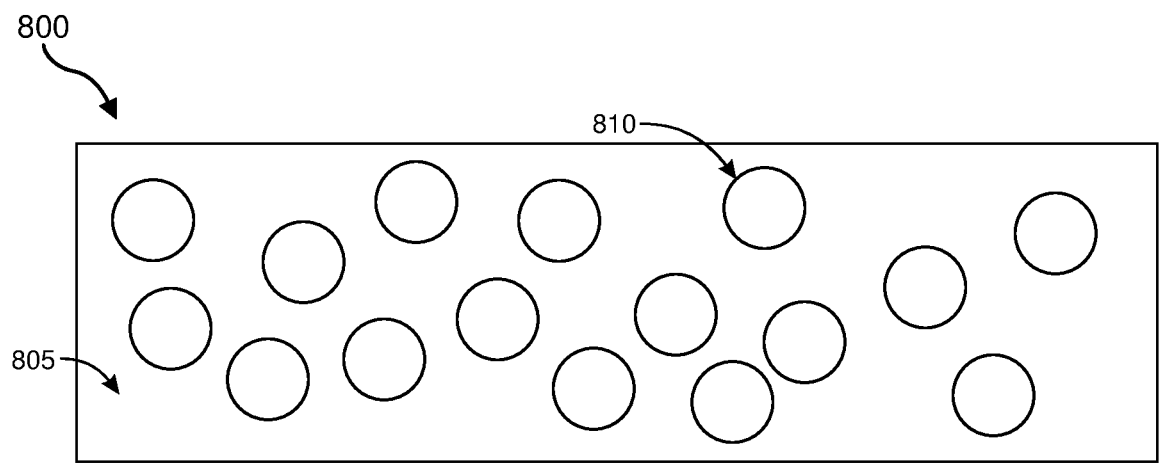
FIG. 8 shows a diagram illustrating aspects of the formation of nanovoids in a material (e.g., a polymer), in accordance with example embodiments of the disclosure.

Diagram 800 in FIG. 8 illustrates aspects of the formation of nanovoids in a material 810 (e.g., a polymer), in accordance with example embodiments of the disclosure. In various embodiments, a material precursor, such as a monomer, may be deposited with a solvent, and the monomer and solvent may be cured leading to the separation of the solvent and the formation of nanovoids 805 in the material 810. In at least one embodiment, a material precursor, such as a monomer, may be deposited with a cavitation agent (with or without a solvent), the cavitation agent may be degraded, and the monomer may be cured (during and/or following degradation of the cavitation agent) leading to the formation of the nanovoids 805 in the material 810. In at least one example, the cavitation agent may include, for example, a thermal- or UV-initiated hydrosilation catalyst. Suitable hydrosilation catalysts may include, but not be limited to, bis(acetylacetonate)platinum II, n(2-cyclopentadienyl) trialkylplatinum, and/or the like.

In some embodiments, the nanovoids may occupy at least approximately 10% (e.g., approximately 10% by volume, approximately 20% by volume, approximately 30% by volume, approximately 40% by volume, approximately 50% by volume, approximately 60% by volume, approximately 70% by volume, approximately 80% by volume, approximately 90% by volume) of the volume of the nanovoided material. The voids and/or nanovoids may be either closed- or open-celled, or a mixture thereof. If they are open-celled, the void size may be the minimum average diameter of the cell. In some embodiments, the nanovoided material may include a thermoset material and/or any other suitable material.

The voids and/or nanovoids may be any suitable size and, in some embodiments, the voids may approach the scale of the thickness of the nanovoided material. For example, the voids may be between approximately 10 nm to about equal to the thickness of the nanovoided material. In some embodiments, the voids may have average diameters between approximately 10 nm and approximately 1000 nm (e.g., approximately 10 nm, approximately 20 nm, approximately 30 nm, approximately 40 nm, approximately 50 nm, approximately 60 nm, approximately 70 nm, approximately 80 nm, approximately 90 nm, approximately 100 nm, approximately 110 nm, approximately 120 nm, approximately 130 nm, approximately 140 nm, approximately 150 nm, approximately 160 nm, approximately 170 nm, approximately 180 nm, approximately 190 nm, approximately 200 nm, approximately 250 nm, approximately 300 nm, approximately 400 nm, approximately 500 nm, approximately 600 nm, approximately 700 nm, approximately 800 nm, approximately 900 nm, approximately 1000 nm).

Figure 9:
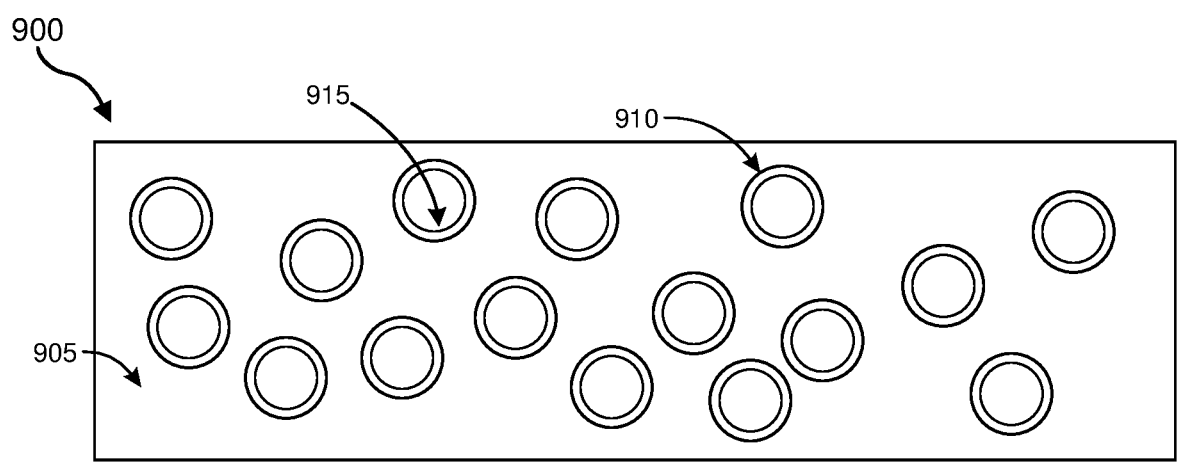
FIG. 9 shows a diagram illustrating aspects of the formation of nanovoids in a material using a B-stage polymer, in accordance with example embodiments of the disclosure.

FIG. 9 shows a diagram 900 illustrating aspects of a nanovoided material 910 using a B-stage polymer (also referred to as B-stage epoxy or partially cured epoxy and/or polymer) for the formation of nanovoids 905, where the nanovoids may be coated. To form the nanovoids 905 in the nanovoided material 910, two monomers may be mixed. Further, a first monomer may be cured by a first source of radiation (e.g., UV light), while another monomer may be cured by a second source of radiation (e.g., heat or x-rays). Further, when the first monomer is cured to form a polymer, the polymer may exclude the second monomer along with the solvent and thereby form nanovoids 905, which may include the solvent and/or the second monomer internally.

As noted, two different sources of radiation may be used to generate the nanovoided material 905 for B-stage epoxies. In an example system, a first monomer may include a free-radical-initiated monomer which may be activated (e.g., polymerized) by UV light, while a second monomer may include a different monomer type, such as an epoxy, that is unaffected by the first type of radiation (e.g., UV light). Moreover, the second monomer may be cured by a second type of radiation, such as heat. Accordingly, when the first monomer, second monomer, and solvent are mixed, the first monomer and second monomer may both dissolve in the solvent. The mixture may then be irradiated with a first type of radiation (e.g., UV light) such that the first monomer begins to polymerize and form a first polymer. The solvent and the second monomer regions that surround the polymerizing first monomer may be excluded from the polymerizing first monomer, leading to the formation of partially formed nanovoids. Further, excluded regions that include the solvent and second monomer may remain inside the partially formed nanovoids. When heat is further applied to the partially formed nanovoids, the solvent may start evaporating and the second monomer may coat the insides of the partially formed nanovoids, leading to the formation of the nanovoids 905 shown in FIG. 9. Accordingly, the nanovoids 905 may not move; rather the material (e.g., the second monomer and/or solvent) in the partially formed nanovoids may evaporate and the second monomer and/or the solvent may coat the interiors of the nanovoids 905. The second monomer (e.g., an epoxy) may then be polymerized to form polymer layers 915 that include a second polymer coating the interiors of the nanovoids defined in the nanovoided material 910.

Moreover, because the different polymers (e.g., a first polymer and a second polymer) respectively formed from the first and second monomers may have different indices of diffraction and/or different mechanical properties, more sophisticated nanovoided materials may be formed using the B-stage epoxies and associated processes. For example, it may be possible to generate nanovoided materials 910 that have switchable reflectivity without the need to completely compress the nanovoids to generate the switching effect with high efficiency. This may be done by keeping the nanovoids 905 from fully collapsing at least in part due to different mechanical properties of the nanovoids 905, or of a polymer (e.g., the second polymer) coating the interior surfaces of the nanovoids 905, as compared with the polymer matrix (e.g., the first polymer) in which they are formed.

In some embodiments, the nanovoids (e.g., nanovoids 805 and/or 905) may contain a compressible fluid (e.g., air). In another embodiment, once the solvent separates from the curable material to form the nanovoids during the fabrication of the nanovoided material, the nanovoided material may be dried and the solvent may be replaced by a compressible fluid (e.g., air). In another embodiment, when pressure is applied to the nanovoided materials, the voids may not be fully eliminated as there may still be compressed fluid (e.g., air) in the voids. In another embodiment, the voids may be further reduced in volume by compression; for example, by forming nanovoids that have an open-cell structure. Accordingly, the compressible fluid may be able to at least partially diffuse into the compressed matrix upon compression of the nanovoided material (e.g., as further shown and described in connection with FIG. 2).

Figure 10:
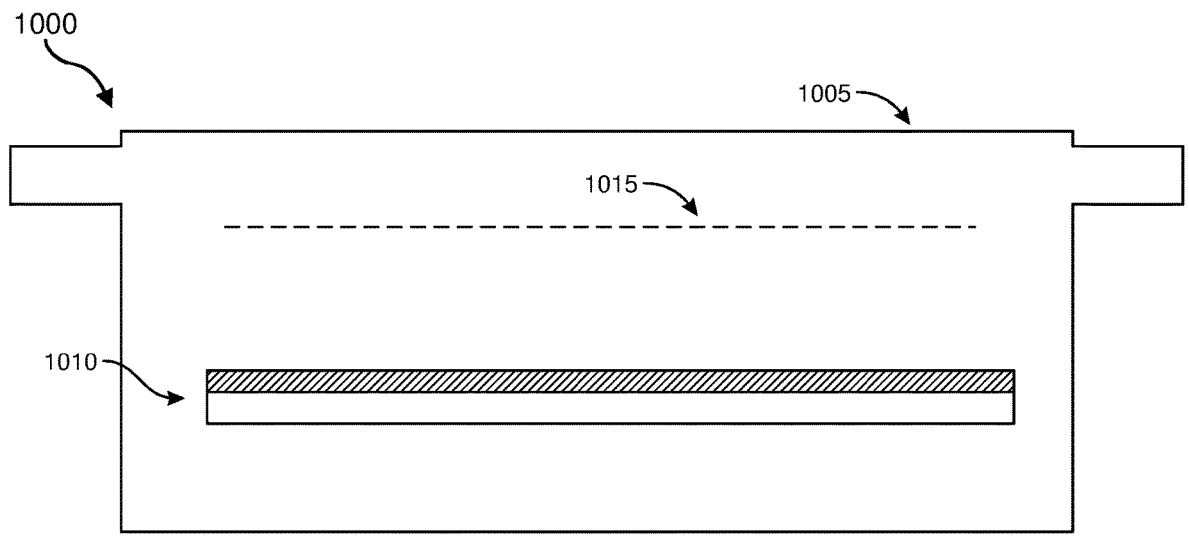
FIG. 10 shows a diagram of an example apparatus for the fabrication of the disclosed devices, in accordance with example embodiments of the disclosure.

FIG. 10 shows another diagram of an example apparatus for the fabrication of the electroactive devices, in accordance with example embodiments of the disclosure. In particular, diagram 1000 shows an apparatus 1005 that may perform an initiated chemical vapor deposition (CVD) process. In some embodiments, in iCVD, an electric cooler (not shown) may be used to cool a substrate 1010 and a mixture of, for example, an acrylate and a solvent vapor may be flowed into apparatus 1005. This mixture may pass through an array of heated elements 1015 that may be located in an upper portion of the apparatus 1005. In at least one embodiment, the heated elements 1015 may be heated to an elevated temperature, such as, for example, about 200° C. An initiator may be operated in conjunction with the heated elements 1015 to cool the substrate 1010 to a temperature below that of the heated elements. Accordingly, a mixture of solvent and monomer may condense on the surface of the substrate 1010, where the solvent may be cured. Alternatively or additionally, multiple layers of monomer and solvent-monomer mixture may be alternately deposited. The layers may be stacked through, for example, sequential deposition; the solvent may then be removed (e.g., through evaporation by heating) to generate a nanovoided structure. In another embodiment, relatively precise control of the temperature of the substrate and the multilayer deposited structure may be used to generate a high-quality switchable device. For example, active cooling may be used. In at least one embodiment, Henry's law may be used to infer that minor fluctuations of the low-pressure environment (e.g., the pressure of the chamber) will likely not substantially affect the vapor pressure of the solvent and may therefore not negatively impact the quality, structure, and/or uniformity of the nanovoided materials.

In some embodiments, the apparatus 1005 may apply an atmospheric pressure CVD (APCVD) coating formation technique (e.g., CVD at atmospheric pressure). In another embodiment, the apparatus 1005 may apply a low-pressure CVD (LPCVD) process (e.g., CVD at sub-atmospheric pressures). In some embodiments, LPCVD may make use of reduced pressures that may reduce unwanted gas-phase reactions and improve the deposited material's uniformity across the substrate. In one embodiment, the apparatus 1005 may apply an ultrahigh vacuum CVD (UHVCVD) process (e.g., CVD at very low pressure, typically below approximately $10^{-6}$ Pa (equivalently, approximately $10^{-8}$ torr)).

In some embodiments, the apparatus 1005 may apply an aerosol-assisted CVD (AACVD) process (e.g., a CVD in which the precursors are transported to the electroactive device) by means of a liquid/gas aerosol, which may be generated ultrasonically. In some embodiments, AACVD may be used with non-volatile precursors.

In some embodiments, the apparatus 1005 may apply a direct liquid injection CVD (DLICVD) process (e.g., a CVD in which the precursors are in liquid form, such as, for example, a liquid or solid dissolved in a solvent). Liquid solutions may be injected in the apparatus 1005 towards one or more injectors. The precursor vapors may then be transported to the electroactive device as in CVD. DLICVD may be used on liquid or solid precursors, and high growth rates for the deposited materials may be reached using this technique.

In some embodiments, the apparatus 1005 may apply a hot wall CVD process (e.g., CVD in which the chamber of the apparatus 1005 is heated by an external power source and the electroactive device is heated by radiation from the heated wall of the chamber). In another embodiment, the apparatus 1005 may apply a cold wall CVD process (e.g., a CVD in which only the materials forming the electroactive device are directly heated, for example, by induction, while the walls of the chamber are maintained at room temperature).

In some embodiments, the apparatus 1005 may apply a microwave plasma-assisted CVD (MPCVD) process, where microwaves are used to enhance chemical reaction rates of the precursors for forming the electroactive device. In another embodiment, the apparatus 1005 may apply a plasma-enhanced CVD (PECVD) process (e.g., CVD that uses plasma to enhance chemical reaction rates of the precursors). In some embodiments, PECVD processing may allow deposition of materials at lower temperatures, which may be useful in withstanding damage to the resulting electroactive device or in depositing certain materials (e.g., organic materials and/or some polymers).

In some embodiments, the apparatus 1005 may apply a remote plasma-enhanced CVD (RPECVD) process. In some embodiments, RPECVD may be similar to PECVD except that the materials for forming the electroactive device may not be directly in the plasma discharge region. In some embodiments, removal of the materials for forming the electroactive device from the plasma region may allow for the reduction of processing temperatures down to room temperature.

In some embodiments, the apparatus 1005 may apply an atomic-layer CVD (ALCVD) process. In some embodiments, ALCVD may deposit successive layers of different substances to produce an electroactive device that includes layered, crystalline film coatings.

In some embodiments, the apparatus 1005 may apply a combustion chemical vapor deposition (CCVD) process. In some embodiments, CCVD (also referred to as flame pyrolysis) may refer to an open-atmosphere, flame-based technique for depositing high-quality thin films (e.g., layers of material ranging from fractions of a nanometer (e.g., a monolayer) to several micrometers in thickness) and nanomaterials, which may be used in forming the electroactive device.

In some embodiments, the apparatus 1005 may apply a hot filament CVD (HFCVD) process, which may also be referred to as catalytic CVD (cat-CVD) or initiated CVD (iCVD), as noted above. In some embodiments, this process may use a hot filament to chemically decompose the source gases to form the materials of the electroactive device. Moreover, the filament temperature and temperature of portions of materials for forming the electroactive device may be independently controlled, allowing colder temperatures for better adsorption rates at the electroactive device, and higher temperatures necessary for decomposition of precursors to free radicals at the filament.

In some embodiments, the apparatus 1005 may apply a hybrid physical-chemical vapor deposition (HPCVD) process. HPCVD may involve both chemical decomposition of a precursor gas and vaporization of a solid source to form the materials of the electroactive device.

In some embodiments, the apparatus 1005 may apply metalorganic chemical vapor deposition (MOCVD) process (e.g., a CVD that uses metalorganic precursors) to form materials of the electroactive device.

In some embodiments, the apparatus 1005 may apply a rapid thermal CVD (RTCVD) process. This CVD process may use heating lamps or other methods to rapidly heat the materials forming the electroactive device. Heating only materials deposited on a substrate on which electroactive device is formed rather than undeposited precursors or chamber walls may reduce unwanted gas-phase reactions that may lead to particle formation in the electroactive device.

In some embodiments, the apparatus 1005 may apply a photo-initiated CVD (PICVD) process. This process may use UV light to stimulate chemical reactions in the precursor materials used to make the materials for the electroactive device. Under certain conditions, PICVD may be operated at or near atmospheric pressure.

In some embodiments, while various CVD processes are generally described above, the various materials described herein (e.g., the curable materials, the non-curable materials, the conductive materials, and/or any additional materials and layers) for forming an electroactive device may be disposed (e.g., on a substrate) in any suitable manner. As noted, a substrate may generally refer to any material (e.g., a layer) on which another layer or element is formed. In another embodiment, various materials for forming the electroactive device may be printed (e.g., via inkjet printing, silkscreen printing, etc.). In some aspects, inkjet printing may refer to a type of computer printing that operates by propelling droplets of material onto a substrate (e.g., a flexible or inflexible substrate). In other embodiments, silkscreen printing may refer to a printing technique whereby a mesh is used to transfer a material (e.g., curable material and/or non-curable material) onto a substrate (e.g., a flexible or inflexible substrate), except in areas made impermeable to the material by a blocking stencil. A blade or squeegee may be moved across the screen to fill the open mesh apertures with the material, and a reverse stroke may then cause the screen to touch the substrate momentarily along a line of contact. This may cause the material to wet the substrate and be pulled out of the mesh apertures as the screen springs back after the blade has passed. In one embodiment, the materials may be vaporized (e.g., via thermal evaporation, CVD, PVD, and/or the like), as described above. In at least one embodiment, materials for forming the electroactive device may be disposed (e.g., on a substrate) using a co-flow process and/or a roll-to-roll process. In some embodiments, monomers (or oligomers, prepolymers, and/or other pre-cursor materials) for forming electroactive polymer materials may optionally be mixed with a solvent and the solvent may be removed from the electroactive polymer during and/or following curing to form nanovoids within the electroactive polymer.

Figure 11:
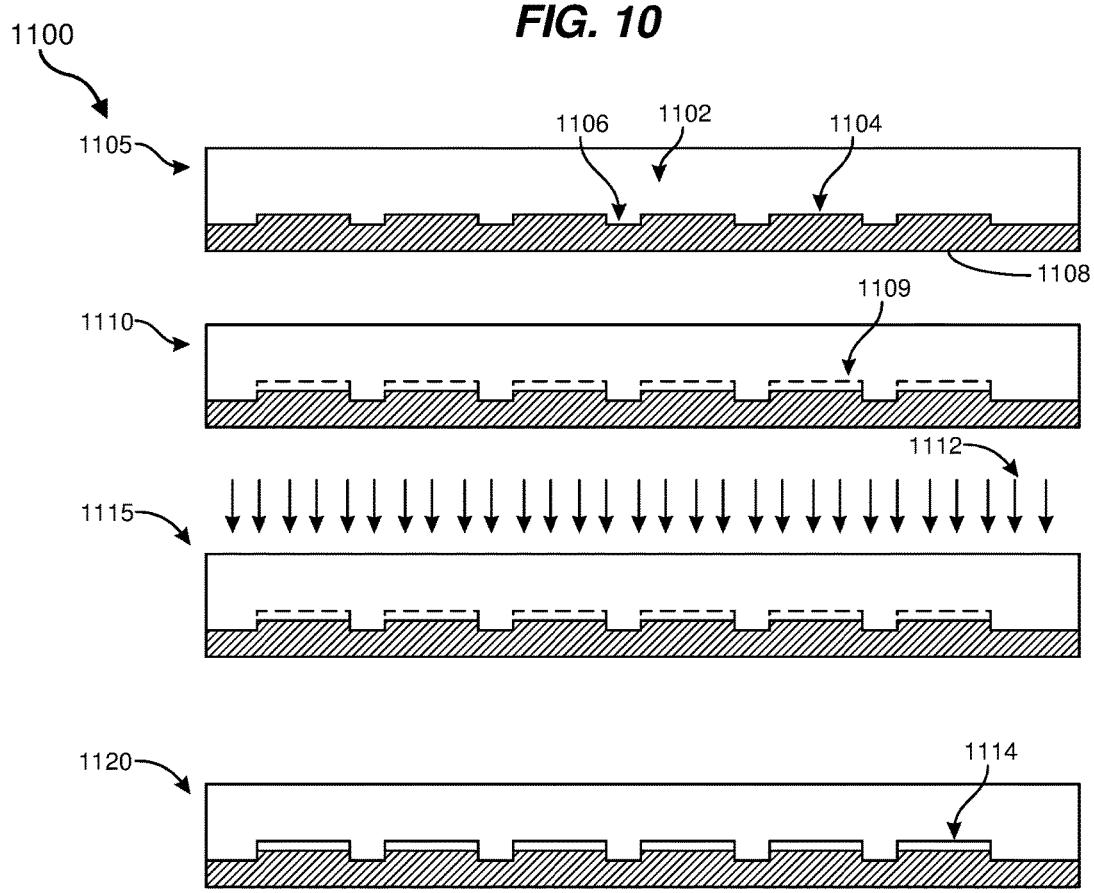
FIG. 11 shows a diagram illustrating how the formation of the nanovoided material may be further structured and controlled, in accordance with example embodiments of the disclosure.
Figure 12:
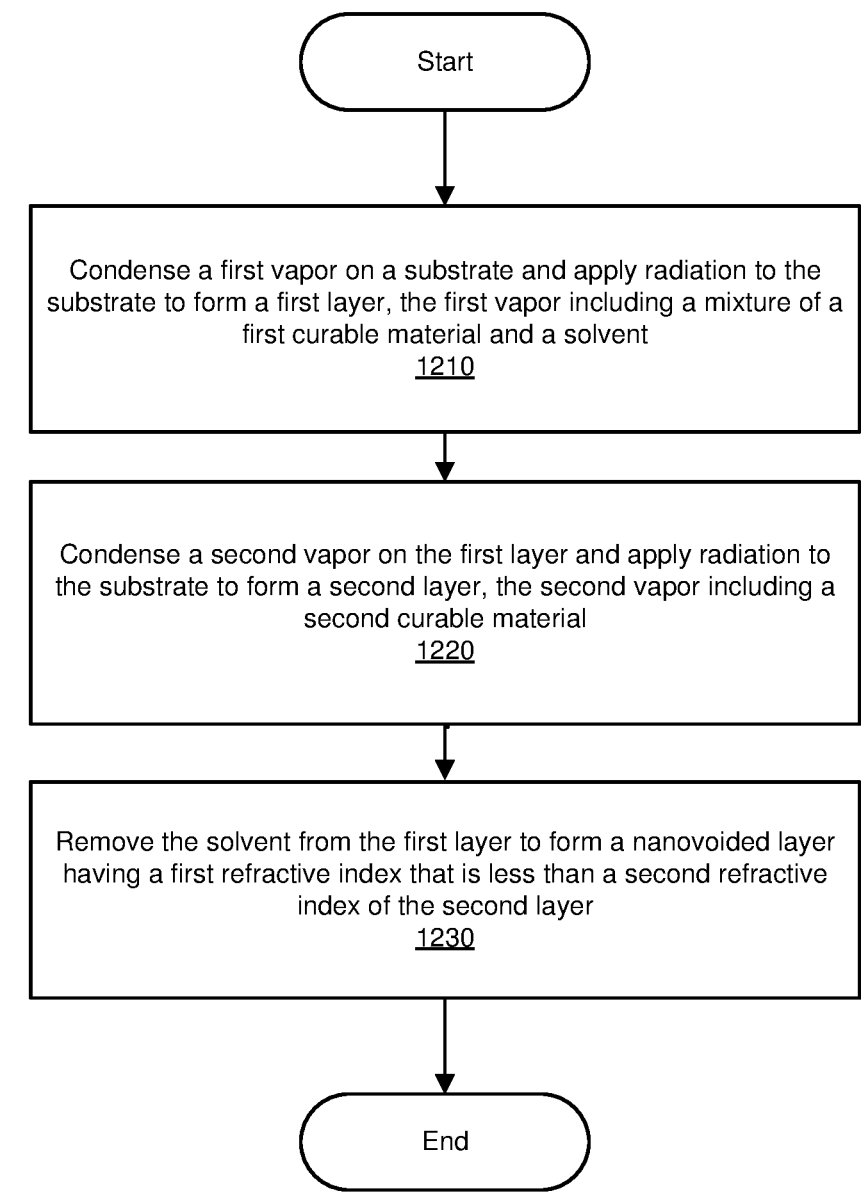
FIG. 12 shows a flow diagram of an example method for fabrication of an electroactive device, in accordance with one or more embodiments of the disclosure.

FIG. 11 is an illustration of how the formation of the nanovoided material may be further structured and controlled, in accordance with example embodiments of the disclosure. In particular, FIG. 11 shows a system 1100 in which a nanovoided material may be formed on a substrate having different surface energies for different portions of the substrate, which may allow for controlling the solvent concentration of the formed nanovoided material, as will be described. For example, as shown in diagram 1105, a monomer-solvent mixture 1102 may be deposited on a substrate 1108. In some examples, the substrate 1108 may have first surface regions 1104 (e.g., protruding regions) having a first surface energy and second surface regions 1106 (e.g., recessed regions) having a second surface energy. Accordingly, as indicated by diagram 1110, when the monomer-solvent mixture 1102 is disposed on the substrate 1108, the difference in the surface energies may lead to the first surface regions 1104 serving as nucleation sites and thereby attracting the solvent preferentially as compared with the monomer, while the second surface regions 1106 may not. Accordingly, regions 1109 of the monomer-solvent mixture 1102 (e.g., regions corresponding to the first surface regions 1104) on the substrate 1108 may be formed that have a relatively higher solvent concentration but have a relatively lower monomer concentration. Subsequently, as shown in diagram 1115, the substrate 1108 and the monomer-solvent mixture 1102 may be irradiated with radiation 1112 (e.g., UV light) from a source of radiation and the monomer in the monomer-solvent mixture 1102 may be cured. Accordingly, as shown in diagram 1120, a higher density of voids may be generated near nucleation sites on the first surface regions 1104, thereby generating controlled structures 1114 from the monomer-solvent mixture 1102.

FIG. 12 shows an example flow chart for the fabrication of portions of an electroactive device, in accordance with example embodiments of the disclosure. At 1210, a first vapor may be condensed on a substrate and radiation may be applied to the substrate to form a first layer, the first vapor including a mixture of a first curable material and a solvent, in accordance with various embodiments disclosed herein. In some embodiments, the first vapor may be generated from a fluid that may have the first curable material (e.g., a monomer, a compound including a monomer and an initiator, etc.) and the solvent. In some examples, an initiator may include an optional crosslinking agent (e.g., TMPTA). In at least one embodiment, the fluid may flow into or near a heat source as a part of a deposition apparatus (e.g., similar to apparatus 600), creating the first vapor. This first vapor may condense on a surface (e.g., a first transparent conductor) of, for example, a rotating drum of the deposition apparatus to form the first layer, the first layer being a first optically transparent material. In some embodiments, a curing source and/or heat source may be used to apply radiation to the substrate to form the first layer. In some embodiments, the curing source and/or heat source may include an energized array of filaments that may generate actinic energy to heat the monomers and/or initiator. The monomers and/or initiator may react upon heating by the filaments to form the optically transparent material.

At 1220, a second vapor may be condensed on the first layer and radiation may be applied to the substrate to form a second layer, the second vapor including a second curable material, in accordance with various embodiments disclosed herein. In some embodiments, the second vapor may also be generated from a fluid that may have both a second curable material and a solvent. The formation of the second layer may be similar to the formation of the first layer as described above.

At 1230, the solvent may be removed from the first layer to form a nanovoided layer having a first refractive index that is less than a second refractive index of the second layer, in accordance with various embodiments disclosed herein. As noted, in some embodiments, a curing source and/or a heat source may be used to apply radiation to the first and/or second layers to remove the solvent. In other embodiments, the solvent may be removed between depositions of layers (e.g., between the deposition of the first layer and the second layer) or after deposition of two or more layers, for example, via the application of radiation. That is, the partially or fully fabricated electroactive device (e.g., a switchable Bragg reflector) may be cured, for example, by a curing source. Further, after the deposition of the materials, the device may be coated with an additional material, such as, for example, a metal coating and/or a metal oxide coating, or combinations thereof.

In some aspects, another method of generating a nanovoided polymer for use in connection with a electroactive device (such as electroactive devices described variously herein) may include co-depositing (i) a monomer or mixture of monomers, (ii) a surfactant, and (iii) a non-solvent material associated with the monomer(s) that is compatible with the surfactant. In various examples, the monomer(s) may include, but not be limited to, ethyl acrylate, butyl acrylate, octyl acrylate, ethylethoxy ethyl acrylate, 2-chloroethyl vinyl ether, chloromethyl acrylate, methacrylic acid, allyl glycidyl ether, or N-methylol acrylamide. Other curing agents such as polyamines, higher fatty acids or their esters, or sulfur may be used as the monomer(s). In some aspects, the surfactant may be ionic or non-ionic (for example Span 80, available from Sigma-Aldrich Company). In another embodiment, the non-solvent material may include organic or inorganic non-solvent materials. For instance, the non-solvent material may include water or a hydrocarbon or may include a highly polar organic compound such as ethylene glycol. As noted, the monomer or monomers, non-solvent, and surfactant may be co-deposited; alternatively, the monomer or monomers, non-solvent, and surfactant may be deposited sequentially. In one embodiment, a substrate temperature may be controlled to generate and control one or more properties of the resulting emulsion generated by co-depositing or sequentially depositing the monomer or monomers, non-solvent, and surfactant. The substrate may be treated to prevent destabilization of the emulsion. For example, an aluminum layer may be coated with a thin polymer layer made by depositing a monomer followed by curing the monomer.

Figure 13:
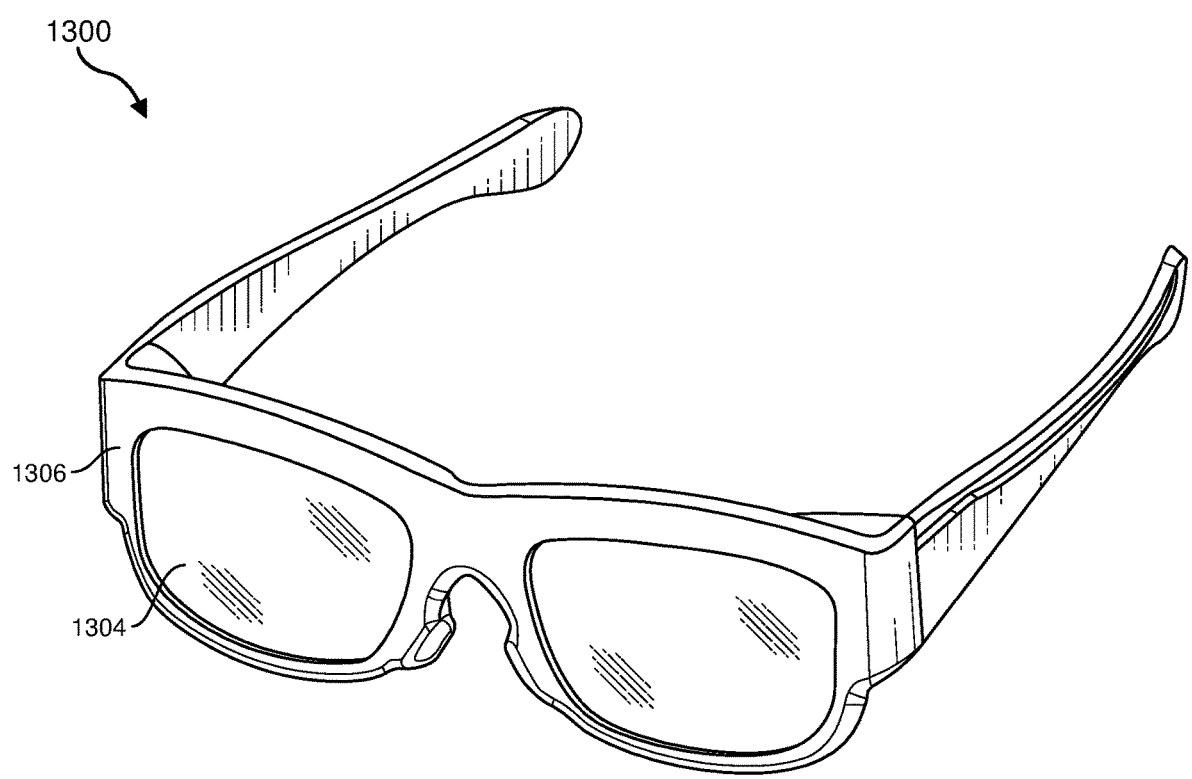
FIG. 13 shows a diagram of a head-mounted display, in accordance with example embodiments of the disclosure.

FIG. 13 shows a diagram of a head-mounted display (HMD) 1300, in accordance with example embodiments of the disclosure. In some embodiments, the HMD 1300 may include an NED, which may include one or more display devices. The display device 1304 may present media to a user. Examples of media presented by the display device 1304 include one or more images, a series of images (e.g., a video), audio, or some combination thereof. In some embodiments, audio may be presented via an external device (e.g., speakers and/or headphones) that receives audio information from the display device 1304, a console (not shown), or both, and presents audio data based on the audio information. The display device 1304 may be generally configured to operate as an AR NED, such that a user may see media projected by the display device 1304 and see the real-world environment through the display device 1304. However, in some embodiments, the display device 1304 may be modified to also operate as a virtual reality (VR) NED, a mixed reality (MR) NED, or some combination thereof. Accordingly, in some embodiments, the display device 1304 may augment views of a physical, real-world environment with computer-generated elements (e.g., images, video, sound, etc.).

The display device 1304 shown in FIG. 13 may include a support or frame 1306 that secures the display device 1304 in place on the head of a user, in embodiments in which the display device 1304 includes separate left and right displays. In some embodiments, the frame 1306 may be a frame of eye-wear glasses. The display device 1304 may include structures (e.g., waveguides) with devices (e.g., Bragg reflectors, holographic Bragg reflectors, etc.) as described herein. In some embodiments, the devices may be manufactured by the processes described herein.

As noted, the nanovoided layers may be used in the fabrication of a switchable Bragg reflector or grating or to create switchable holograms. In some embodiments, the nanovoided layers may be used to fabricate mirrors for AR systems that may include partially transparent displays that mix digital images with the real world. Light rays may reflect off a mirror to redirect into a user's eye. In other words, the eye may receive redirected rays from the digital display (e.g., from a projector or light-emitting diodes). Further, the optical device that combines the generated digital image with the real-world light may be referred to as a combiner. The combiner may operate like a partial mirror that redirects display light and selectively lets light in through from the real world. In such applications, a high reflectivity for the redirected light along with a high transmission for ambient light may be desired. In another embodiment, the combiner may be fabricated using the nanovoided layers, such that when the combiner is switched on the combiner is reflective. Further, the display light may be pulsed, and the combiner may be switched off so that the combiner is transmissive for real-world light, but simultaneously reflects a portion of the display light for overlaying images onto the user's field of view. In some embodiments, the disclosed devices (e.g., the switchable Bragg gratings and reflectors) may have higher contrast, lower polarization sensitivity, and higher switching times than comparable devices that use liquid crystals.

Embodiments of the instant disclosure may include or be implemented in conjunction with an artificial reality system. Artificial reality is a form of reality that has been adjusted in some manner before presentation to a user, which, as noted, may include, e.g., a VR, an AR, a MR, a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a HMD connected to a host computer system, a standalone HMD, a mobile device or computing system, or any other hardware platform capable of providing artificial reality content to one or more viewers.

The process parameters and sequence of the steps described and/or illustrated herein are given by way of example only and may be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A device comprising:
   a first conductor;
   a first optically transparent material electrically coupled to the first conductor, the first optically transparent material including a plurality of nanovoids within an elastomer matrix and having a first refractive index,
   wherein the plurality of nanovoids includes gas-filled pores within the elastomer matrix wherein the gas includes one of sulfur hexafluoride and fluorocarbon;
   a second optically transparent material electrically coupled to the first optically transparent material, the second optically transparent material having a second refractive index that is greater than the first refractive index; and a second conductor electrically coupled to the second optically transparent material.

2. The device of claim 1, wherein the device is configured to operate in a first state corresponding to a first reflectance of the device for a wavelength range and a second state corresponding to a second reflectance of the device for the wavelength range, wherein the first reflectance is greater than the second reflectance.

3. The device of claim 2, wherein a first voltage is applied between the first conductor and the second conductor when the device is operated in the first state, and a second voltage is applied between the first conductor and the second conductor when the device is operated in the second state, the first voltage being less than the second voltage.

4. The device of claim 2, wherein the first optically transparent material has a first thickness when the device is operated in the first state and a second thickness when the device is operated the second state, the first thickness being greater than the second thickness.

5. The device of claim 2, wherein the first optically transparent material has the first refractive index when the device is operated in the first state and the first optically transparent material has a third refractive index when the device is operated in the second state, the third refractive index being greater than the first refractive index.

6. The device of claim 2, wherein the first optically transparent material has a first density, when the device is operated in the first state, that is less than a second density of the first optically transparent material when the device is operated in the second state.

7. The device of claim 1, wherein the second optically transparent material comprises poly(methyl methacrylate) (PMMA) and the second refractive index is between approximately 1.4 and approximately 1.6.

8. The device of claim 1, wherein the first optically transparent material comprises a crosslinked polymer and the first refractive index is between approximately 1.0 and approximately 1.3.

9. The device of claim 1, wherein at least one of the first conductor and the second conductor comprises a transparent conductor.

10. The device of claim 1, wherein the device further comprises a first integer number of additional optically transparent materials that each include a plurality of nanovoids within an elastomer matrix and have a refractive index that is substantially equal to the first refractive index, and a second integer number of additional optically transparent materials that each have a refractive index that is greater than the first refractive index.

11. The device of claim 10, wherein a reflectance of the device for a wavelength range is based at least in part on the first integer number or the second integer number.

12. The device of claim 1, wherein the first optically transparent material includes an electroactive polymer.

13. The device of claim 1, wherein the first refractive index is modified by an electrical potential applied between the first conductor and the second conductor due to a thickness change of the first optically transparent material.

* * * * *